US012223720B2

(12) United States Patent
Zhou et al.

(10) Patent No.: US 12,223,720 B2
(45) Date of Patent: Feb. 11, 2025

(54) GENERATING HIGHLIGHT VIDEO FROM VIDEO AND TEXT INPUTS

(71) Applicant: Baidu USA, LLC, Sunnyvale, CA (US)

(72) Inventors: Xin Zhou, Mountain View, CA (US); Le Kang, Dublin, CA (US); Zhiyu Cheng, Sunnyvale, CA (US); Hao Tian, Cupertino, CA (US); Daming Lu, Dublin, CA (US); Dapeng Li, Los Altos, CA (US); Jingya Xun, San Jose, CA (US); Jeff Wang, San Jose, CA (US); Xi Chen, San Jose, CA (US); Xing Li, Santa Clara, CA (US)

(73) Assignee: Baidu USA, LLC, Sunnyvale, CA (US)

( * ) Notice: Subject to any disclaimer, the term of this patent is extended or adjusted under 35 U.S.C. 154(b) by 428 days.

(21) Appl. No.: 17/533,769

(22) Filed: Nov. 23, 2021

(65) Prior Publication Data

US 2022/0189173 A1 Jun. 16, 2022

Related U.S. Application Data

(63) Continuation-in-part of application No. 17/393,373, filed on Aug. 3, 2021, now Pat. No. 11,769,327.
(Continued)

(51) Int. Cl.
*G06F 16/78* (2019.01)
*G06F 16/783* (2019.01)
(Continued)

(52) U.S. Cl.
CPC .......... *G06V 20/47* (2022.01); *G06F 16/7844* (2019.01); *G06F 16/7867* (2019.01);
(Continued)

(58) Field of Classification Search
CPC ...... G06F 40/205; G06F 16/78; G06F 16/783; G06N 3/04; G06N 3/08; G06V 20/40; G06V 30/148; G10L 13/08
(Continued)

(56) References Cited

U.S. PATENT DOCUMENTS 9,646,651 B1 5/2017 Richardson
10,303,768 B2 5/2019 Divakaran
(Continued)

FOREIGN PATENT DOCUMENTS

CN 107615766 A 1/2018
CN 109684511 A 4/2019
(Continued)

OTHER PUBLICATIONS

Yu et al.,"Comprehensive dataset of broadcast soccer videos," In IEEE Conf. Multimedia Inf. Process.& Retr. (MIPR), pp. 418-423, 2018.(7pgs).
(Continued)

*Primary Examiner* — Daquan Zhao
(74) *Attorney, Agent, or Firm* — Oppedahl Patent Law Firm LLC

(57) ABSTRACT

Presented herein are systems, methods, and datasets for automatically and precisely generating highlight or summary videos of content. In one or more embodiments, the inputs comprise a text (e.g., an article) of the key event(s) (e.g., a goal, a player action, etc.) in an activity (e.g., a game, a concert, etc.) and a video or videos of the activity. In one or more embodiments, the output is a short video of an event or events in the text, in which the video may include commentary about the highlighted events and/or other audio (e.g., music), which may also be automatically synthesized.

20 Claims, 30 Drawing Sheets

Related U.S. Application Data

(60) Provisional application No. 63/124,832, filed on Dec. 13, 2020.

(51) Int. Cl.
| | |
|---|---|
| *G06F 40/205* | (2020.01) |
| *G06N 3/045* | (2023.01) |
| *G06N 3/08* | (2023.01) |
| *G06V 20/40* | (2022.01) |
| *G06V 30/148* | (2022.01) |
| *G10L 13/08* | (2013.01) |
| *G06N 3/04* | (2023.01) |

(52) U.S. Cl.
CPC .......... *G06F 40/205* (2020.01); *G06N 3/045* (2023.01); *G06N 3/08* (2013.01); *G06V 20/44* (2022.01); *G06V 30/153* (2022.01); *G10L 13/08* (2013.01)

(58) Field of Classification Search
USPC .................. 386/278, 280, 282, 285, 239
See application file for complete search history.

(56) References Cited

U.S. PATENT DOCUMENTS

| | | | | |
|---|---|---|---|---|
| 2002/0051077 | A1* | 5/2002 | Liou | H04N 21/8549 348/E7.063 |
| 2007/0171303 | A1* | 7/2007 | Barbieri | H04N 21/482 725/135 |
| 2016/0014482 | A1 | 1/2016 | Chen | |
| 2016/0104513 | A1 | 4/2016 | Bloch | |
| 2017/0147906 | A1 | 5/2017 | Shekhar | |
| 2020/0134316 | A1 | 4/2020 | Krishnamurthy et al. | |
| 2020/0258241 | A1 | 8/2020 | Liu | |
| 2021/0248375 | A1 | 8/2021 | Geng | |
| 2021/0256051 | A1 | 8/2021 | Wang | |
| 2021/0272599 | A1 | 9/2021 | Patterson | |
| 2021/0319232 | A1 | 10/2021 | Perazzi | |
| 2022/0014807 | A1 | 1/2022 | Lin | |
| 2022/0124257 | A1 | 4/2022 | Zhao | |
| 2022/0327835 | A1 | 10/2022 | Ning | |

FOREIGN PATENT DOCUMENTS

| | | |
|---|---|---|
| CN | 111953910 A | 11/2020 |
| CN | 113268515 A | 8/2021 |

OTHER PUBLICATIONS

S. Zhang et al.,"CityPersons: A diverse dataset for pedestrian detection," arXiv preprint arXiv:1702.05693, 2017. (12ps).

Y. Zhang et al.,"Byte-Track: Multi-object tracking by associating every detection box," arXiv preprint arXiv:2110.06864, 2021. (13pgs).

Y. Zhang et al.,"FairMOT: On the fairness of detection and re-identification in multiple object tracking," arXiv preprint arXiv:2004.01888, 2021. (19pgs).

L. Zhang et al.,"Person Re-identification in the wild," arXiv preprint arXiv:1604.02531, 2017. (10pgs).

Boiarov et al., Large Scale Landmark Recognition via Deep Metric Learning, arXiv preprint arXiv:1908.10192, 2019. (10pgs).

E. D. Cubuk et al.,"AutoAugment: Learning Augmentation Policies from Data," arXiv preprint arXiv:1805.09501, 2019. (14 pgs).

Deng et al.,"ArcFace:Additive Angular Margin Loss for Deep Face Recognition," In IEEE/CVF Conf.Comput. Vis. & Pattern Recogn. (CVPR). Inst. Elect. & Electron. Engineers (IEEE), 2019. (10pgs).

Dosovitskiy et al.,"An Image is Worth 16x16 Words: Transformers for Image Recognition at Scale," arXiv preprint arXiv:2010.11929, 2021. (22pgs).

Zhang et al.,"mixup: Beyond empirical risk minimization," arXiv preprint arXiv:1710.09412, 2017.(11 pgs).

Zisserman et al.,"The Kinetics Human Action Video Dataset," arXiv preprint arXiv:1705.06950, 2017. (22pgs).

Xin Zhou et al.,"Feature Combination Meets Attention: Baidu Soccer Embeddings and Transformer based Temporal Detection," arXiv preprint arXiv: 2106.14447, Jun. 28, 2021. (7pgs).

"SoccerNet-v2—A Dataset and Benchmarks for Holistic Understanding of Broadcast Soccer Videos," [online], [Retrieved Feb. 9, 2023]. Retrieved from Internet <URL: https://eval.ai/web/challenges/challenge-page/761/overview> (3pgs).

Deliege et al.,"SoccerNet-v2 : A Dataset and Benchmarks for Holistic Understanding of Broadcast Soccer Videos," arXiv preprint arXiv:2011.13367v3, Apr. 2021. (17pgs).

Xie et al.,"Structure analysis of soccer video with hidden markov models, "IEEE International Conference on Acoustics, Speech, and Signal Processing, 2002. (4pgs).

Wang et al.,"Soccer replay detection using scene transition structure analysis, "IEEE International Conference on Acoustics, Speech, and Signal Processing, 2005. (4pgs).

Sangüesa et al.,"Using Player's Body-Orientation to Model Pass Feasibility in Soccer," IEEE/CVF Conf. on Computer Vision & Pattern Recognition Workshops (CVPRW), 2020. (10pgs).

Cioppa et al.,"Multimodal and multiview distillation for real-time player detection on a football field" In Proceedings of the IEEE/CVF Conf. on Computer Vision & Pattern Recognition (CVPR) Workshops, 2020. ( 11pgs).

Cioppa et al.,"A Context-Aware Loss Function for Action Spotting in Soccer Videos," In EEE/CVF Conference on Computer Vision & Pattern Recognition (CVPR), 2020. (11pgs).

Deliege et al.,"SoccerNet-v2 : A Dataset and Benchmarks for Holistic Understanding of Broadcast Soccer Videos," arXiv preprint arXiv:2011.13367v1, Nov. 2020. (17pgs).

Duan et al.,"Omni-sourced Webly-supervised Learning for Video Recognition," arXiv preprint arXiv:2003.13042v2, 2020. (26pgs).

Feichtenhofer et al.,"SlowFast Networks for Video Recognition," IEEE/CVF International Conference on Computer Vision (ICCV), 2019. (10pgs).

Ghadiyaram et al.,"Large-scale weakly-supervised pre-training for video action recognition," IEEE/CVF Conference on Computer Vision & Pattern Recognition (CVPR), 2019. (10pgs).

Giancola et al.,"SoccerNet: A Scalable Dataset for Action Spotting in Soccer Videos," IEEE Conference on Computer Vision & Pattern Recognition (CVPR) Workshops, 2018. (11pgs).

Giancola et al., "Temporally-Aware Feature Pooling for Action Spotting in Soccer Broadcasts," arXiv preprint arXiv:2104.06779v1, Apr. 2021. (11pgs).

Fu et al.,"Unsupervised Pre-training for Person Reidentification," arXiv preprint arXiv: 2012.03753, 2021. (10pgs).

Hendrycks et al.,"AugMix: A Simple Data Processing Method to Improve Robustness and Uncertainty," arXiv preprint arXiv:1912.02781, 2020. (15pgs).

Huang et al.,"PP-YOLOv2:A practical object detector," arXiv preprint arXiv:2104.10419, 2021. (7pgs).

Khosla et al.,"Supervised Contrastive Learning," arXiv preprint arXiv:2004.11362, 2021. (23pgs).

Tsung-Yi Lin et al.,"Focal Loss for Dense Object Detection," arXiv preprint arXiv:1708.02002, 2018 (10pgs).

Z. Liu et al.,"Video Swin Transformer," arXiv preprint arXiv:2106.13230, Jun. 2021. (12pgs).

H. Luo et al.,"Self-Supervised Pre-Training for Transformer-Based Person Re-Identification," arXiv preprint arXiv: 2111.12084, Nov. 2021. (15pgs).

Schroff et al.,"FaceNet: A unified embedding for face recognition and clustering," arXiv preprint arXiv:1503.03832, 2015. (10pgs).

Aäron van den Oord et al.,"Representation Learning with Contrastive Predictive Coding," arXiv preprint arXiv:1807.03748, 2019. (13pgs).

Wang et al.,"Shape and Appearance Context Modeling," In Int. Conf. Comput. Vis. Inst. Elect. and Electron. Engineers (IEEE), 2007. (8pgs).

Liu et al.,"Soccer video event detection using 3D convolutional networks and shot boundary detection via deep feature distance," In Int. Conf. Neural Inf. Process., vol. 10635 of Lect. Notes Comput. Sci., 2017. [ABSTRACT] (5pgs).

(56) References Cited

OTHER PUBLICATIONS

Liu et al.,"Detecting and matching related objects with one proposal multiple predictions," arXiv preprint arXiv:2104.12574, 2021. (8pgs).
Lu et al.,"Learning to track and identify players from broadcast sports videos, "IEEE Trans. Pattern Anal. Mach. Intell., 2013. (14pgs).
Luiten et al.,"Trackeval," [online], [Retrieved Mar. 15, 2023]. Retrieved from Internet <URL:https://github.com/JonathonLuiten/TrackEval> 2020. (1pg).
Luiten et al.,"HOTA: A higher order metric for evaluating multi-object tracking," Int. J. Comp. Vis., 129(2):548-578, Oct. 2021. (31pgs).
Luo et al.,"Multiple object tracking: A literature review," Artif. Intell., 293, Apr. 2021. (23 pgs).
Lyu et al.,"UA-DETRAC 2018: Report of AVSS2018 & IWT4S challenge on advanced traffic monitoring," In IEEE Int. Conf. Adv. Video & Signal Based Surveillance (AVSS), 2018. (6p).
Manafifard et al.,"A survey on player tracking in soccer videos," Comp. Vis. and Image Underst., 159:19-46, Jun. 2017. [ABSTRACT] (6pgs).
Milan et al.,"MOT16: A benchmark for multi-object tracking," arXiv preprint arXiv:1603.00831, 2016. (12pgs).
Bewley et al.,"Simple online and realtime tracking," arXiv preprint arXiv:1602.00763, 2016. (5 pgs).
Bochinski et al.,"Extending IOU based multi-object tracking by visual information," In IEEE Int. Conf. Adv. Video & Signal Based Surveillance (AVSS), 2018. (6pgs).
"Byte Track Code," [online], [Retrieved Mar. 27, 2023]. Retrieved from Internet <URL:https://github.com/ifzhang/ByteTrack> (1pg).
Cioppa et al.,"Camera Calibration and Player Localization in SoccerNet-v2 and Investigation of their Representations for Action Spotting" In IEEE Int. Conf. Comput. Vis. & Pattern Recogn Work (CVPRW), Jun. 2021. (11pgs).
Cioppa et al.,"ARTHuS: Adaptive Real-Time Human Segmentation in Sports through Online Distillation," In IEEE Int. Conf. Comput. Vis. & Pattern Recogn Work (CVPRW), 2019. (10pg.
Cioppa et al.,"Multimodal & multiview distillation for real-time player detection on a football field,"IEEE Int. Conf. Comput. Vis. & Pattern Recogn. Work.(CVPRW), 2020.(10pgs).
Dave et al.,"TAO: A Large-Scale Benchmark for Tracking Any Object," arXiv preprint arXiv:2005.10356, 2020. (32pgs).
DeepSORT in PaddleDetection [online], [Retrieved Feb. 27, 2023]. Retrieved from Internet <URL:https://github.com/PaddlePaddle/PaddleDetection> (1pg).
Dendorfer et al.,"MOT20: A benchmark for multi object tracking in crowded scenes," arXiv preprint arXiv: 2003.09003, 2020. (7pgs).
Dendorfer et al.,"dendorferpatrick /MOTChallengeEvalKit ," [online], [Retrieved Mar. 27, 2023]. Retrieved from Internet <URL: https://github.com/dendorferpatrick/MOTChallengeEvalKit> 2020. (1pg).
Dollar et al.,"Pedestrian Detection: A Benchmark," In IEEE Int. Conf. Comput. Vis. & Pattern Recogn. (CVPR), 2009. (8pgs).
Ess et al.,"A Mobile Vision System for Robust Multi-PersonTracking," In IEEE Int. Conf. Comput. Vis. and Pattern Recogn. (CVPR), 2008. (8pgs).
"FairMOT in PaddleDetection," [online], [Retrieved Mar. 27, 2023]. Retrieved from Internet <URL: https://github.com/PaddlePaddle/PaddleDetection/tree/release/2.3/configs/mot/fairmot> (1pg).
Fakhar et al.,"Event detection in soccer videos using unsupervised learning of spatio-temporal features based on pooled spatial pyramid model," Multimedia Tools and Applicat., 78(12):16995-17025, Jun. 2019. [Abstract Only] (15pgs).
Feng et al.,"SSET: a dataset for shot segmentation, event detection, player tracking in soccer videos," Multimedia Tools and Applicat., 79(39):28971-28992, Oct. 2020. (23pgs).
Ferryman et al., "PETS2009: Dataset & challenge," In IEEE Int. Work. Perform. Evaluation Track. Surveill. (PETS), 2009. (8pgs).
L. Zheng et al., "Scalable Person Re-identification: A Benchmark," In Int. Conf. Comput. Vis. Inst. Elect. and Electron. Engineers (IEEE), 2015. (9pgs).
Z. Zhong et al., "Random Erasing Data Augmentation," arXiv preprint arXiv: 1708.04896, 2017. (10pgs).
X. Zhou et al., "Feature Combination Meets Attention: Baidu Soccer Embeddings and Transformer based Temporal Detection," arXiv preprint arXiv: 2106.14447, Jun. 2021. (7pgs).
Concatenate FFmpeg, Concatenating media files, [online], [Retrieved Mar. 22, 2023]. Retrieved from Internet <URL:https://trac.ffmpeg.org/wiki/Concatenate#No. 1>(5pgs).
Andriluka et al.,"Monocular 3D Pose Estimation and Tracking by Detection," In IEEE Int. Conf. Comput. Vis. & Pattern Recogn (CVPR), 2010. (8pgs).
Anjum et al.,"CTMC: Cell tracking with mitosis detection dataset challenge," In IEEE Int. Conf. Comput. Vis. & Pattern Recogn (CVPR), 2020. (10pgs).
PaddlePaddle/PaddleDetection, object detection & instance segmentation toolkit based on PaddlePaddle, 2019: [online], [Retrieved Mar. 15, 2023]. Retrieved from Internet <URL:https://github.com/PaddlePaddle/PaddleDetection> (1 pg).
Bergmann et al.,"Tracking without bells and whistles," In IEEE Int. Conf. Comput. Vis. (ICCV) 2019. (11pgs).
Bernardin et al.,"Evaluating multiple object tracking performance: the Clear MOT metrics," EURASIP Journal on Image and Video Processing, 2008. (10pgs).
Bertini et al.,"Player identification in soccer videos," In ACM SIGMM Int. workshop on Multimedia inf. retrieval, 2005. (9pgs).
Iwase et al.,"Parallel tracking of all soccer players by integrating detected positions in multiple view images," In IEEE Int. Conf. Pattern Recogn. (ICPR), 2004. (4pgs).
Jiang et al.,"Automatic soccer video event detection based on a deep neural network combined CNN and RNN," In IEEE Int. Conf. Tools with Artif.Intell. (ICTAI), 2016. [Abstract] (4pgs).
Jiang et al.,"SoccerDB: A large-scale database for comprehensive video understanding," arXiv preprint arXiv:1912.04465, 2020. (8pgs).
R.E. Kalman,"A new approach to linear filtering and prediction problems," J. Basic Eng., 82(1):35-45 1960. (12 pgs).
Khan et al.,"Learning deep C3D features for soccer video event detection," In Int. Conf. Emerging Technol. (ICET), 2018. [Abstract] (4 pgs).
Koshkina et al.,"Contrastive learning for sports video: Unsupervised player classification," arXiv preprint arXiv:2104.10068, 2021. (11pgs).
Leal-Taix'e et al.,"MOTchallenge 2015: Towards a benchmark for multi-target tracking," arXiv preprint arXiv:1504.01942, 2015. (15 pgs).
Li et al.,"Jersey number recognition with semi-supervised spatial transformer network," In IEEE Int. Conf. Comput. Vis. and Pattern Recogn. Work. (CVPRW), 2018. (8pgs).
Liu et al.,"Pose-guided R-CNN for jersey number recognition in sports," In IEEE Int. Conf. Comput. Vis. and Pattern Recogn.Work. (CVPRW), 2019. (10 pgs).
Saraogi et al.,"Event recognition in broadcast soccer videos," In Indian Conf. Comput. Vision, Graph. Image Process., pp. 1-7, Dec. 2016. (7pgs).
Shao et al.,"CrowdHuman: A benchmark for detecting human in a crowd," arXiv preprint arXiv:1805.00123, 2018. (9pgs).
Sigari et al.,"A framework for dynamic restructuring of semantic video analysis systems based on learning attention control," Image and Vis. Comp., 53:20-34, 2016. [Abstract] (2pgs).
Song et al.,"Distractor-aware tracker with a domain-special optimized benchmark for soccer player tracking," Assoc. for Comput. Machinery, In Int. Conf. Multimedia Retrieval, p. 276-284, 2021. (9pgs).
Sullivan et al.,"Tracking and labelling of interacting multiple targets," In Eur. Conf. Comput. Vis. (ECCV), vol. 3953 of Lect. Notes Comput. Sci., 2006. (15pgs).
Sun et al.,"Deep affinity network for multiple object tracking," arXiv preprint arXiv:1810.11780, 2019. (15pgs).
Sundararaman et al.,"Tracking pedestrian heads in dense crowd," arXiv preprint arXiv: 2103.13516, 2021. (16pgs).
SuperAnnotate AI [online], [Retrieved Mar. 20, 2023]. Retrieved from Internet <URL:https://superannotate.com>(8pgs).
Notice of Allowance and Fee(s) Due mailed May 3, 2023, in U.S. Appl. No. 17/393,373. (5pgs).

(56) References Cited

OTHER PUBLICATIONS

Vanderplaetse et al.,"Improved Soccer Action Spotting using both Audio & Video Streams," IEEE/CVF Con on Computer Vision & Pattern Recognition Workshops (CVPRW), 2020.(11pgs).
Sanford et al.,"Group Activity Detection from Trajectory and Video Data in Soccer," arXiv preprint arXiv: 2004.10299, 2020. (9pgs).
Cioppa et al.,"Multimodal & Multiview distillation for real-time player detection on a football field," arXiv preprint arXiv: 2004.07544, 2020. ( 10pgs).
Heilbron et al.,"ActivityNet: A Large-Scale Video Benchmark for Human Activity Understanding," IEEE Conference on Computer Vision & Pattern Recognition (CVPR), 2015. (10 pgs).
Karpathy et al.,"Large-Scale Video Classification with Convolutional Neural Networks," IEEE Conference on Computer Vision and Pattern Recognition, 2014. (8pgs).
Kuehne et al.,"HMDB: A Large Video Database for Human Motion Recognition," International Conference on Computer Vision, 2011. (8 pgs).
Abu-El-Haija et al.,"YouTube-8M: A Large-Scale Video Classification Benchmark," arXiv preprint arXiv:1609.08675, 2016. (10pgs).
Shi et al.,"ASTER: An Attentional Scene Text Recognizer with Flexible Rectification, "IEEE transactions on pattern analysis and machine intelligence, 2018. (14 pgs).
Response to Non-Final Office Action filed Mar. 14, 2023, in U.S. Appl. No. 17/393,373 (15pgs).
Redmon et al.,"You Only Look Once: Unified, Real-Time Object Detection, "In IEEE Conference on Computer Vision and Pattern Recognition (CVPR), 2016. (10pgs).
Cioppa et al.,"A Context-Aware Loss Function for Action Spotting in Soccer Videos," In EEE/CVF Conference on Computer Vision and Pattern Recognition (CVPR), 2020. (11pgs).
Feichtenhofer et al.,"SlowFast Networks for Video Recognition," In Proceedings of the IEEE international conference on computer vision (ICCV), 2019. (10pgs).
Xiao et al.,"Audiovisual SlowFast Networks for Video Recognition," arXiv preprint arXiv:2001.08740, 2020. (14pgs).
Wang et al.,"What Makes Training Multi-Modal Classification Networks Hard?," In Proceedings of the IEEE/CVF Conference on Computer Vision & Pattern Recognition, 2020. (11pgs).
Kay et al.,"The Kinetics Human Action Video Dataset," arXiv preprint arXiv: 1705.06950, 2017. (22pgs).
Giancola et al.,"SoccerNet: A Scalable Dataset for Action Spotting in Soccer Videos," IEEE/CVF Conf. on Computer Vision & Pattern Recognition Workshops (CVPRW), 2018. (11pg).
He et al.,"Deep Residual Learning for Image Recognition," In IEEE Conference on Computer Vision & Pattern Recognition (CVPR), 2016. (9pgs).
Deng et al.,"ImageNet: A Large-Scale Hierarchical Image Database," In CVPR, 2009. (9pgs).
Thomas et al.,"Computer vision for sports: Current applications and research topics," Computer Vision & Image Understanding, 2017. (34pgs).
Bo He et al.,"GTA: Global temporal attention for video action understanding," arXiv preprint arXiv:2012.08510v1, 2020. (12pgs).
He et al.,"Deep residual learning for image recognition," IEEE Conference on Computer Vision and Pattern Recognition (CVPR), 2016. (9pgs).
Krizhevsky et al., "ImageNet classification with deep convolutional neural networks," Advances in neural information processing systems, 2012. (9pgs).
Neimark et al.,"Video Transformer Network," arXiv preprint arXiv:2102.00719, Aug. 2021. (11pgs).
Sanford et al.,"Group activity detection from trajectory & video data in soccer," IEEE/CVF Conf. on Computer Vision & Pattern Recognition Workshops (CVPRW), 2020. (9pgs).
Thomas et al.,"Computer vision for sports: Current applications and research topics,"Computer Vision and Image Understanding, 2017. (37pgs).

Tran et al.,"Video classification with channel-separated convolutional networks," IEEE/CVF International Conference on Computer Vision (ICCV), 2019. (10pgs).
Vanderplaetse et al.,"Improved soccer action spotting using both audio & video streams, "IEEE/CVF Conf. on Computer Vision & Pattern Recognition Workshops (CVPRW), 2020. (11pg).
Vaswani et al.,"Attention is all you need," arXiv preprint arXiv:1706.03762, 2017. (15 pgs).
Yang et al.,"Temporal pyramid network for action recognition," IEEE/CVF Conference on Computer Vision & Pattern Recognition (CVPR), 2020. (10 pgs).
Tavassolipour et al.,"Event detection and summarization in soccer videos using Bayesian network and copula," IEEE Trans.Circuits & Syst. for Video Technol., 2013. (13pgs).
Theagarajan et al.,"Soccer: Who has the ball? generating visual analytics and player statistics," In IEEE Int. Conf.Comput. Vis.& Pattern Recogn.Work. (CVPRW), 2018. (9pgs).
Tran et al.,"Automatic player detection, tracking and mapping to field modelfor broadcast soccer videos," In Int. Conf. Adv. Mob. Comput. Multimedia (MoMM), pp. 240-243. ACM Press, 2011. (4pgs).
Wang et al.,"Towards real-time multi-object tracking," arXiv preprint arXiv:1909.12605, 2020. (17pgs).
Wen et al.,"UA-Detrac: A new benchmark and protocol for multi-object detection and tracking," arXiv preprint arXiv: 1511.04136, 2020. (27pgs).
Xiao et al.,"Joint detection and identification feature learning for person search," arXiv preprint arXiv:1604.01850, 2017. (10pgs).
Xing et al.,"Multiple player tracking in sports video: A dual-mode twoway Bayesian inference approach with progressive observation modeling," IEEE Trans. Image Process., 20(6):1652-1667, Jun. 2010. (17pgs).
Yang et al.,"3D multiview basketball players detection and localization based on probabilistic occupancy," In Digit. Image Comp. :Tech. & Applicat, 2018.[Abstract] (4pgs).
Nekoui et al.,"FALCONS:FAast Learner-grader for CONtorted poses in Sports, "In IEEE Int. Conf. Comput. Vis. and Pattern Recogn. Work.(CVPRW), 2020. (9pgs).
Nillius et al.,"Multi-target tracking-linking identities using Bayesian network inference," In IEEE Int. Conf. Comput. Vis. and Pattern Recogn. (CVPR), 2006. (8pgs).
Pedersen et al.,"3D-ZeF: A 3D zebrafish tracking benchmark dataset," arXiv preprint arXiv:2006.08466, 2020. (20pgs).
Pettersen et al.,"Soccer video and player position dataset," In ACM Multimedia Syst. Conf., Singapore, Singapore, Mar. 2014. (7pgs).
Rao et al.,"A novel algorithm for detection of soccer ball and player," In Int. Conf. Commun. and Signal Process. (ICCSP), 2015. (5pgs).
Ren et al.,"Faster R-CNN: Towards real-time object detection with region proposal networks," IEEE Trans. Pattern Anal. Mach. Intell., 39(6):1137-1149, Jun. 2017. (9pgs).
Romero-Ferrero et al.,"idtracker. ai: tracking all individuals in small or large collectives of unmarked animals," Nat. methods, 16(2):179-182, Jan. 2019. (56pgs).
S,ah et al.,"Evaluation of image representations for player detection in field sports using convolutional neural networks," In Int. Conf. Theory Appl. Fuzzy Syst. Soft Comput., vol. 896 of Adv. in Intell. Syst. & Comput., Springer, 2019. (8pgs).
Sanford et al.,"Group activity detection from trajectory and video data in soccer," arXiv preprint arXiv:2004.10299, 2020. (9gps).
Figueroa et al.,"Tracking soccer players using the graph representation," In IEEE Int. Conf. Pattern Recogn. (ICPR), 2004. (5pgs).
Gao et al.,"Automatic key moment extraction and highlights generation based on comprehensive soccer video understanding," In IEEE Int. Conf. Multimedia and Expo Work. (ICMEW) 2020. (5pgs) [Abstract Only].
Ge et al.,"YOLOX: Exceeding YOLO series in 2021," arXiv preprint arXiv:2107.08430, 2021. (7pgs).
Geiger et al.,"Are we ready for autonomous Driving? The KITTI vision benchmark suite," In IEEE Int. Conf. Comput. Vis. and Pattern Recogn (CVPR), In IEEE Int. Conf. Comput. Vis. and Pattern Recogn.(CVPR), 2012. (8pgs).

(56) References Cited

OTHER PUBLICATIONS

Gerke et al., "Soccer player recognition using spatial constellation features and jersey number recognition," [online], [Retrieved Mar. 15, 2023]. Retrieved from Internet <URL: https://doi.org/10.1016/j.cviu.2017.04.010> [Abstract] (6pgs).
Hurault et al., "Self-supervised small soccer player detection and tracking," arXiv preprint arXiv:2011.10336, 2020. (14 pgs).
Istasse et al., "Associative embedding for team discrimination," n IEEE Int. Conf. Comput. Vis. and Pattern Recogn. Work. (CVPRW), 2019. (10 pgs).
Neimark et al., "Video Transformer Network," arXiv preprint arXiv:2102.00719, Aug. 17, 2021. (11pgs).
Non-Final Office Action mailed Dec. 16, 2022, in U.S. Appl. No. 17/393,373. ( 9pgs).
Non-Final Office Action mailed May 30, 2024, in U.S. Appl. No. 17/572,624. (7pgs).
Response filed Aug. 6, 2024, in the related matter U.S. Appl. No. 17/572,624. (12pgs).
Notice of Allowance and Fees(s) Due, received Sep. 11, 2024, in the related matter U.S. Appl. No. 17/572,624. (5pgs).
First office action in Chinese application No. 202210979659.0 dated Dec. 18, 2024.

\* cited by examiner

600

Video Time Stamp Annotation Instructions

Watch the 1:10 (70 second) video clip and find the goal event time.
The goal event time is defined as the moment the ball crosses the goal line.
Please select either 0 (default) or 1 for the minute(') of the goal event, and record the seconds(") of the goal event. (a number between 0 and 59)
If there is no goal in a video (very rare case), select "No Goal" under "Goal?", and leave box 1 blank.
Attention: record the time stamp of the video clip, NOT the time stamp in the picture in the soccer game.
For example, if a goal event happens at "0:34" in the video clip, put number 34 in box 1. Don't put any symbols other than numbers between 0 & 59 in box 1.
The goal in video replay/slow motion does NOT count as a goal event.

Soccer Game: 1 minute 10 seconds goal clip

| Team A | 0 – 0 | Team B | 40:18 |

VIDEO

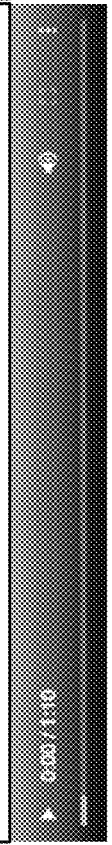

| minute (') | second (") | Goal? | Event Label |
|---|---|---|---|
| 0 ▼ | 0 ▼ | Yes ▼ | Goal event time |

For a video, parse data from game metadata (e.g., commentaries and labels) to obtain approximate timestamps (e.g., in minutes) for events of interest ⸺ 905

Using the approximate timestamps for events of interest in the video and the time mapping to generate candidate clips, in which a candidate clip includes an event of interest ⸺ 910

FIG. 9

GENERATING HIGHLIGHT VIDEO FROM VIDEO AND TEXT INPUTS

CROSS-REFERENCE TO RELATED APPLICATIONS

This patent application is a continuation-in-part of and claims priority benefit under 35 USC § 120 to co-pending and commonly-owned U.S. patent application Ser. No. 17/393,373, filed on 3 Aug. 2021, entitled "AUTOMATICALLY AND PRECISELY GENERATING HIGHLIGHT VIDEOS WITH ARTIFICIAL INTELLIGENCE," and listing Zhiyu Cheng, Le Kang, Xin Zhou, Hao Tian, and Xing Li as inventors, which claims priority benefit under 35 USC § 119 to commonly-owned U.S. Pat. App. No. 63/124,832, filed on 13 Dec. 2020, entitled "AUTOMATICALLY AND PRECISELY GENERATING HIGHLIGHT VIDEOS WITH ARTIFICIAL INTELLIGENCE," and listing Zhiyu Cheng, Le Kang, Xin Zhou, Hao Tian, and Xing Li as inventors; each of the aforementioned patent documents is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to systems and methods for automatically generating a digest or highlights of content.

B. Background

With rapidly evolving Internet technologies and emerging tools, video content, such as sports-related or other event videos, generated online is increasing at an unprecedentedly rapid pace. Especially during the COVID-19 pandemic, the number of views of online videos surged as fans were not allowed to attend events at a venue, such as a stadium or an arena. Creating highlight videos or other events-related videos often involves human efforts to manually edit the original untrimmed videos. For example, the most popular sports videos often comprise short clips of a few seconds, while for machines to understand the video and spot key events precisely is very challenging. Combined with the vast amount of original content that exists, it is very time-consuming and costly to digest the original content into appropriate highlight videos. Also, given limited time to view content, it is important for viewers to be able to have access to condensed content that appropriately captures the salient elements or events.

Accordingly, what is needed are systems and methods that can automatically and precisely generate digested or condensed video content, such as highlight videos.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 6 depicts a user interface embodiment designed for a person to annotation annotate an event time for a video, according to embodiments of the present disclosure.

FIG. 9 depicts a method for generating clips from an input video, according to embodiments of the present disclosure.

DETAILED DESCRIPTION OF EMBODIMENTS

Figure 1:
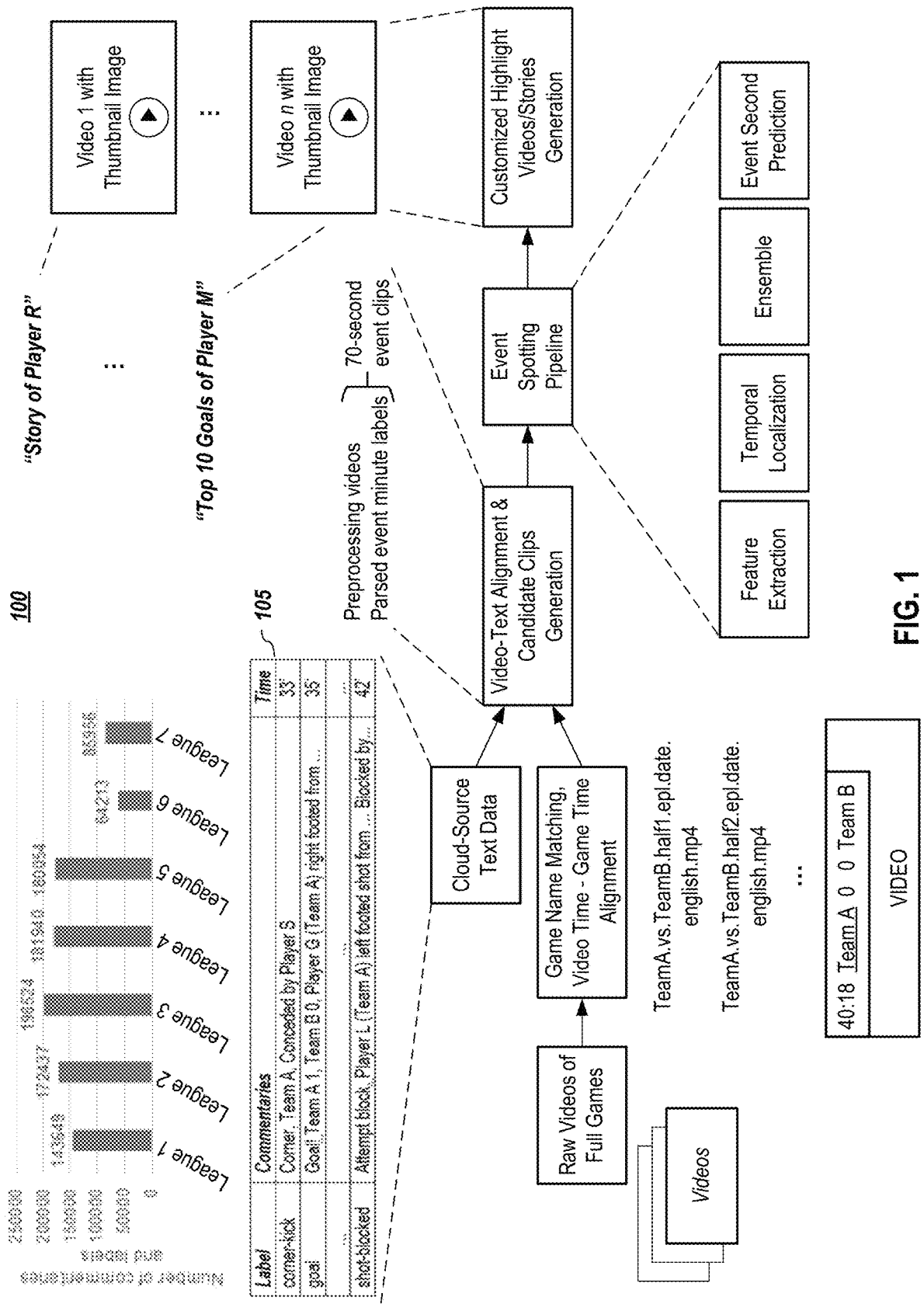
FIG. 1 depicts an overview of a highlight generation system, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms, and any lists that follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to a system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of sporting events, like soccer, aspects of the present disclosure are not so limited. Accordingly, the aspects of the present disclosure may be applied or adapted for use in other contexts.

A. General Introduction

1. General Overview

Presented herein are embodiments to automatically, massively, and precisely generate highlight videos. For sake of illustration, soccer games will be used. However, it shall be noted that embodiments herein may be used or adapted for use for other sports and to non-sports events, such as concerts, performances, speeches, presentations, news, shows, video games, games, sporting events, animations, social media posts, movies, etc. Each of these activities may be referred to as a happening or an event, and a highlight of a happening may be referred to as an event of interest, an occurrence, or a highlight.

Taking advantage of a large-scale multimodal dataset, state-of-the-art deep learning models were created and trained to detect an event or events in games, such as a goal—although over events of interest may also be used (e.g., penalty, injury, a fight, red card, corner kick, penalty kick, etc.). Also presented herein are embodiments of an ensemble learning module to boost the performance of event-of-interest spotting.

FIG. 1 depicts an overview of a highlight generation system, according to embodiments of the present disclosure. In one or more embodiments, large-scale cloud-sourced text data and untrimmed soccer game videos were collected and fed into a series of data processing tools to generate candidate long clips (e.g., 70 seconds—although other time lengths may be used) containing major game events of interest (e.g., a goal event). In one or more embodiments, a novel event-of-interest spotting pipeline precisely locates the moment of the event in the clip. Finally, embodiments can build one or more customized highlight videos/stories around detected highlights.

Figure 2:
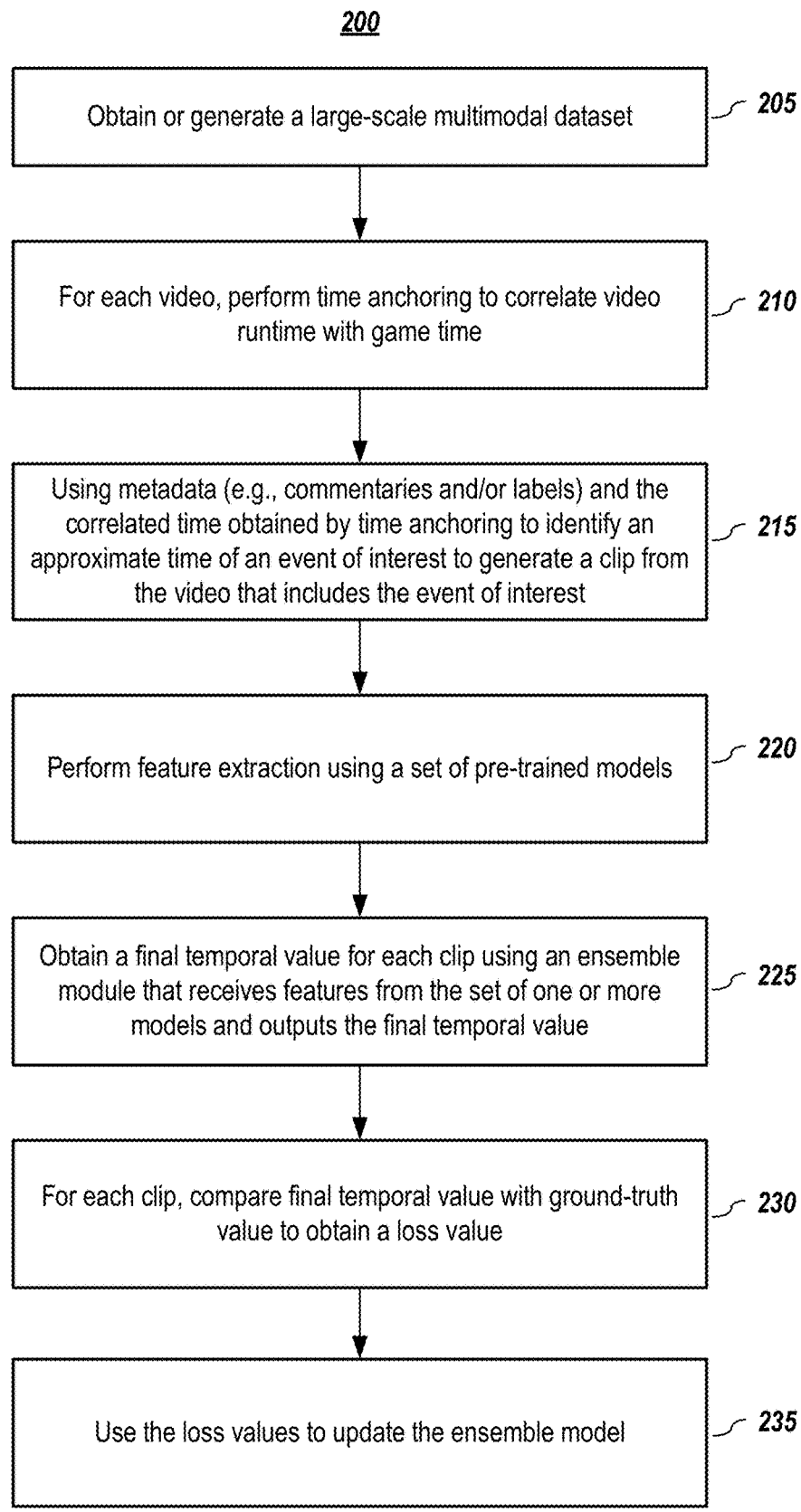
FIG. 2 depicts an overview method for training a generation system, according to embodiments of the present disclosure.

FIG. 2 depicts an overview method for training a generation system, according to embodiments of the present disclosure. To train a generation system, a large-scale multimodal dataset of event-related data must be obtained or generated (205) so that it can be used as training data. Because a video runtime may not correspond to the time in the event, in one or more embodiments, for each video of a set of training videos, time anchoring is performed (210) in order to correlate video runtime with event time. Metadata (e.g., commentaries and/or labels) and the correlated time obtained by time anchoring may then be used to identify (215) an approximate time of an event of interest to generate a clip from the video that includes the event of interest. By using clips rather than the entire video, the processing requirements are greatly reduced. For each clip, features are extracted (220). In one or more embodiments, a set of pre-trained models may be used to obtain the extracted features, which may be multimodal.

In one or more embodiments, for each clip, a final temporal value of the event of interest is obtained (225) using a neural network model. The neural network model may, in embodiments, be an ensemble module that receives features from the set of models and outputs the final temporal value. Given the predicted, final temporal value for each clip, the predicted, final temporal value is compared (230) with its corresponding ground-truth value to obtain a loss value; and the loss values may be used to update (235) the model.

Once trained, the generation system may be output and used to generate highlight video(s) given an input event video.

2. Related Work

In recent years, artificial intelligence has been applied to analyze video contents and generate videos. In sports analytics, many computer vision technologies are developed to understand sports broadcasts. Specifically in soccer, researchers propose algorithms to identify key game events and player actions, analyze pass feasibility using player's body orientation, incorporate both audio and video streams to detect events, recognize group activities on the field using broadcast stream and trajectory data, aggregate deep frame features to spot major game events, and leverage the temporal context information around the actions to handle the intrinsic temporal patterns representing these actions.

Deep neural networks are trained with large-scale datasets for various video understanding tasks. Recent challenges include finding temporal boundaries of activities or localizing the events in the temporal domain. In soccer video understanding, some have defined the goal event as the moment that the ball crosses the goal line.

In one or more embodiments, this definition of a goal is adopted and state-of-the-art deep learning models and methods are leveraged, as well as audio stream processing techniques, plus an ensemble learning module is employed in embodiments to spot precisely the event in soccer video clips.

3. Some Contributions of Embodiments

In this patent document, embodiments of an automatic highlight generation system that can precisely identify an event occurrence in videos are presented. In one or more embodiments, the system may be used to generate highlight videos massively without conventional human editing efforts. Some of the contributions provided by one or more embodiments include, but are not limited to, the following:

A large-scale multimodal soccer dataset, which includes cloud-sourced text data, high-definition videos, was created. And, in one or more embodiments, various data processing mechanisms were applied to parse, clean, and annotate the collected data.

Multimodal data from multiple sources was aligned, and candidate long video clips were generated by cutting the raw videos into 70-second clips using parsed labels from cloud-sourced commentary data.

Embodiments of an event spotting pipeline are presented herein. Embodiments extract advanced feature representations from multiple perspectives, and temporal localization methods are applied to aid in spotting the event in the clips. Additionally, embodiments were further designed with an ensemble learning module to boost the performance of the event spotting. It shall be noted that while the happening may be a soccer game and the event-of-interest may be a goal, embodiments may be used for or adapted for other happenings and other events-of-interest.

The experimental results show that the tested embodiments achieve close to 1 accuracy (0.984) with a tolerance of 5 seconds in spotting the goal event in clips, which outperforms existing work and establishes the new state-of-the-art. This result helps to catch the exact goal moment and generate highlight videos precisely.

4. Patent Document Layout

This patent document is organized as follows: Section B introduces the dataset that was created and how the data was collected and annotated. Embodiments of the methodology for building a highlight generation system embodiment and how to precisely spot the goal event in soccer video clips with the proposed methodologies are presented in Section C. Experimental results are summarized and discussed in Section D. It shall be reiterated that the use of a soccer game as the overall content and the goal as the event within that content is provided by way of illustration only, and one skilled in the art shall recognize that aspects herein may be applied to other content domains, including outside of the gaming domain, and to other events.

B. Data Processing Embodiments

Figure 3:
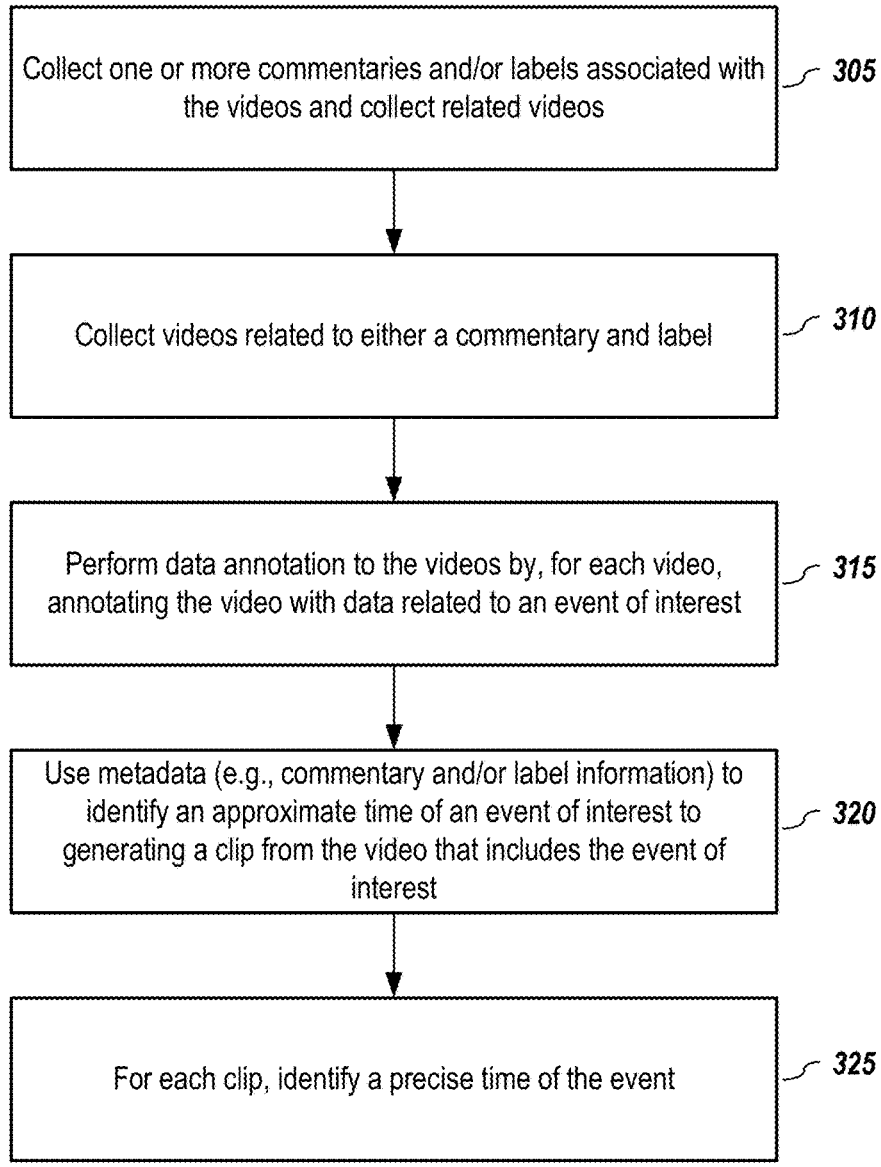
FIG. 3 depicts a general overview of the dataset generation process, according to embodiments of the present disclosure.

To train and develop system embodiments, a large-scale multimodal dataset was created. FIG. 3 depicts a general overview of the dataset generation process, according to embodiments of the present disclosure. In one or more embodiments, one or more commentaries and/or labels associated with videos of the event are collected (305). For example, soccer game commentaries and labels (e.g., corner kick, goal, block shot, header, etc.) (see, e.g., labels and commentaries 105 in FIG. 1) from websites or other sources may be crawled to obtain data. Also, videos associated with the metadata (i.e., commentaries and/or labels) are also collected (305). For embodiments herein, high-definition (HD) untrimmed soccer game videos from various sources were collected. Amazon Mechanical Turk (AMT) was used to annotate (315) the game start time in untrimmed raw videos. In one or more embodiments, the metadata (e.g., commentary and/or label information) may be used (320) to help identify an approximate time of an event of interest to generate a clip from the video that includes the event of interest (e.g., a clip of a goal). Finally, Amazon Mechanical Turk (AMT) was used to identify a precise time of the event of interest (e.g., a goal) in the processed video clips. The annotated goal time may be used as the ground truth during the training of embodiments of the goal spotting models.

1. Data Collection Embodiments

Figure 4:
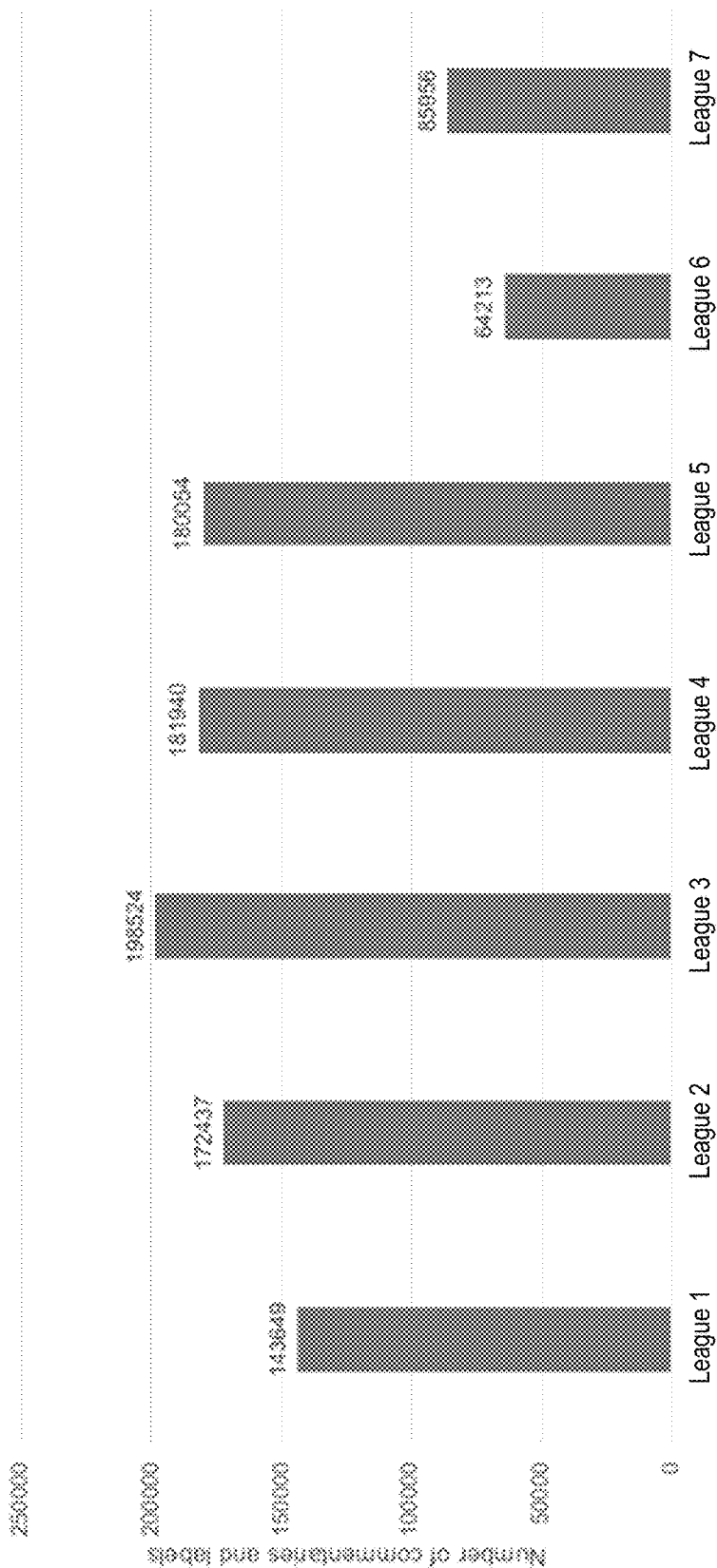
FIG. 4 summarizes some of cloud-sourced text data of commentaries and labels, according to embodiments of the present disclosure.

In one or more embodiments, sports websites were crawled for more than 1,000,000 commentaries and labels, which cover more than 10,000 soccer games from various leagues, dated from 2015 to 2020 seasons. FIG. 4 summarizes some of the cloud-sourced text data of commentaries and labels, according to embodiments of the present disclosure.

The commentaries and labels provide a large amount of information for each game. For example, they include game date, team names, leagues, game events time (e.g., in minutes), event labels such as goal, shot, corner, substitution, foul, etc., and associated player names. These commentaries and labels from cloud-sourced data may be translated into or may be considered as rich metadata for raw video processing embodiments, as well as highlight video generation embodiments.

Figure 5:
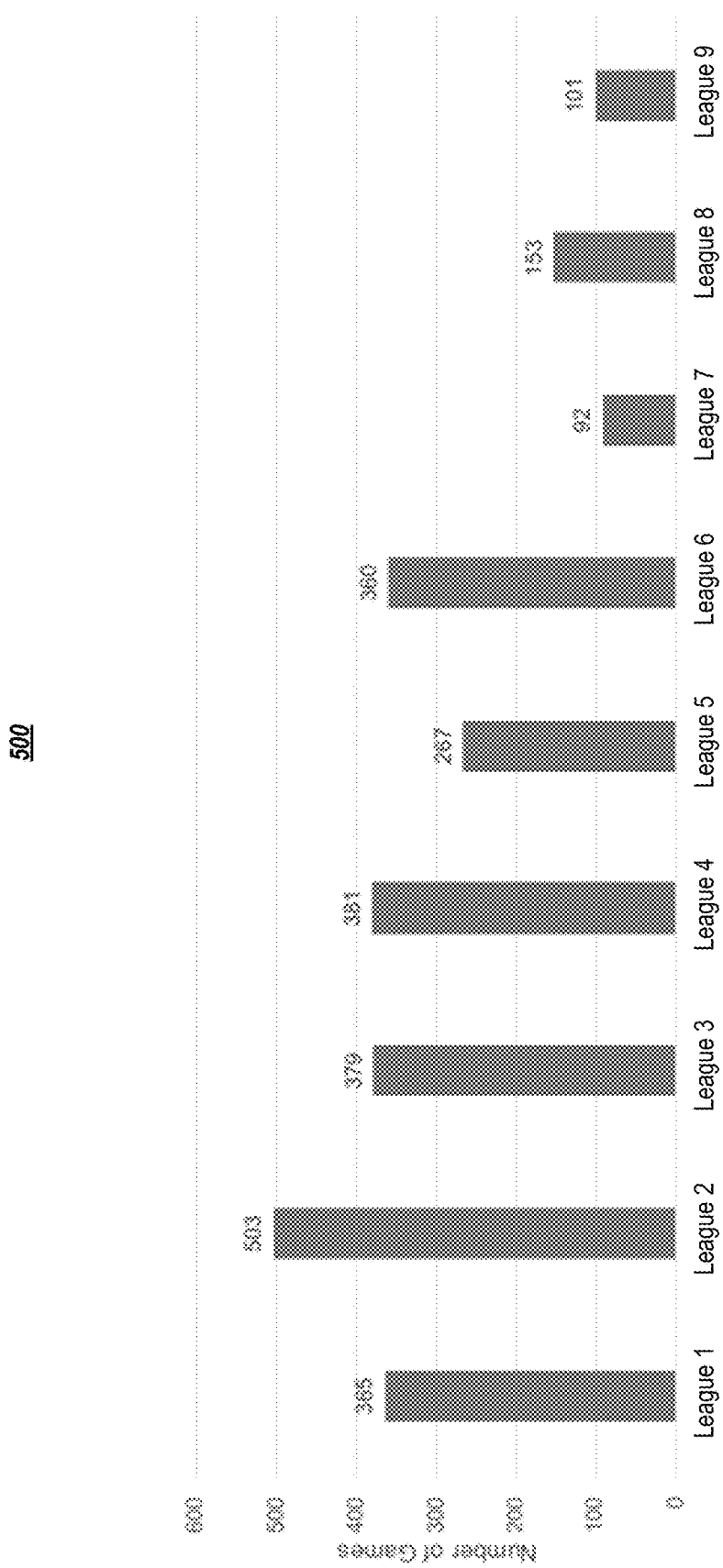
FIG. 5 summarizes collected untrimmed game videos, according to embodiments of the present disclosure.

Also collected were more than 2600 high-definition (720P or above) untrimmed soccer game videos from various online sources. The games come from various leagues, dated from 2014 to 2020. FIG. 5 summarizes collected untrimmed game videos, according to embodiments of the present disclosure.

2. Data Annotation Embodiments

In one or more embodiments, the untrimmed raw videos were first sent to the Amazon Mechanical Turk (AMT) workers to annotate the game start time (defined as the moment when the referee whistles to start the game), then the cloud-sourced game commentaries and labels were parsed to get the goal time in minutes for each game. By combining the goal minute labels and the game start times in the videos, candidate 70-second clips containing goal events were generated. Next, in one or more embodiments, these candidate clips were sent to the AMT for annotating the goal time in second. FIG. 6 depicts a user interface embodiment designed for AMT for goal time annotation, according to embodiments of the present disclosure.

For goal time annotation on AMT, each HIT (Human Intelligence Task, a single worker assignment) contained one (1) candidate clip. Each HIT was assigned to five (5) AMT workers, and the median timestamp value was collected as the ground truth label.

C. METHODOLOGY EMBODIMENTS

In this section, the details of embodiments of each of the highlighted generation system's five modules are presented. By way of brief overview, the first module embodiments in section C.1 are the game time anchoring embodiments, which examine the temporal integrity of the video and map any time in the game to time in the video.

The second module embodiments in section C.2 are the coarse interval extraction embodiments. This module is a major difference compared to commonly studied event spotting pipelines. In embodiments of this module, intervals of 70 seconds (although other size intervals may be used) are extracted, where a specific event is located by utilizing textual metadata. There are at least three reasons this approach is preferred compared to common end-to-end visual event spotting pipelines. First, clips extracted with metadata contain more context information and can be useful across different dimensions. With the metadata, the clips may be used as a temporal cut (such as game highlight videos) or may be used with other clips for the same team or player to generate team, player, and/or season highlight videos. The second reason is robustness, which comes from low event ambiguity of textual data. And third, by analyzing shorter clips for the event of interest rather than the entire video, many resources (processing, processing time, memory, energy consumption, etc.) are preserved.

Embodiments of the third module in system embodiments are the multimodal features extraction. Video features are extracted from multiple perspectives.

Embodiments of the fourth module are the precise temporal localization. Extensive studies of the technicalities of how embodiments of features extraction and temporal localization were designed and implemented are provided in sections C.3 and C.4, respectively.

Finally, embodiments of an ensemble learning module are described in section C.5.

1. Game Time Anchoring Embodiments

It was found that the event clocks in the event videos were sometimes irregular. The primary reason appeared to be that at least some of the event video files that were collected from the Internet contained damaged timestamps or frames. It was observed that in the video collections, about 10% of the video files contained temporal damages that temporally shift part of the video—sometimes by over 10 seconds. Some severe damages that were observed included over 100 seconds of missing frames. Besides errors in the video files, some unexpectedly rare events may have happened during the happening/event, and the event clocks have to stop for a few minutes before they resume. Be it video content damage or game interruption, temporal irregularities may be viewed as temporal jumps, either forward or backward. To locate the clip of any event specified by the metadata precisely, in one or more embodiments, temporal jumps were detected, and calibrations were made accordingly. Therefore, in one or more embodiments, an anchoring mechanism was designed and used.

Figure 7:
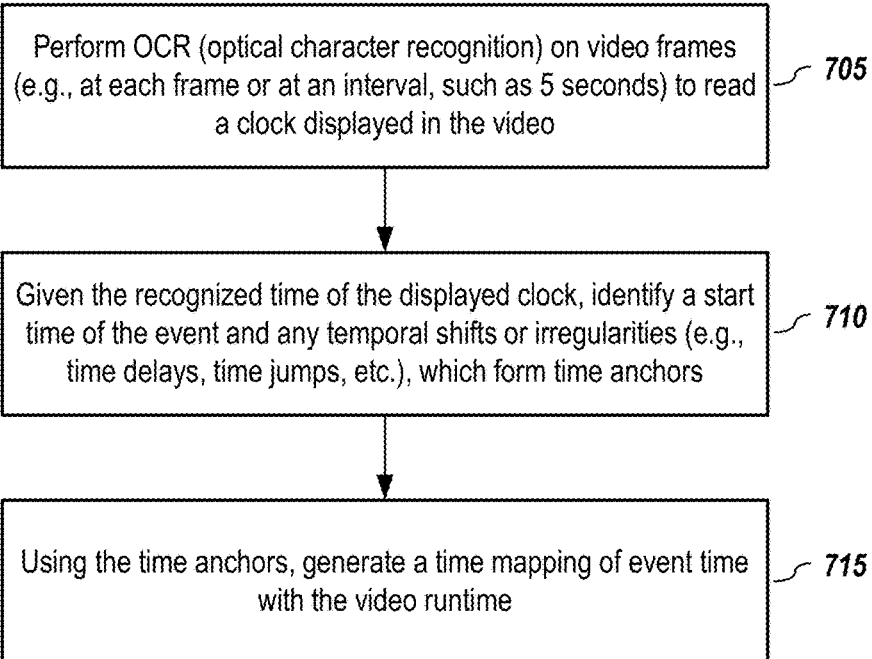
FIG. 7 depicts a method for event time and video runtime correlating, according to embodiments of the present disclosure.
Figure 8:
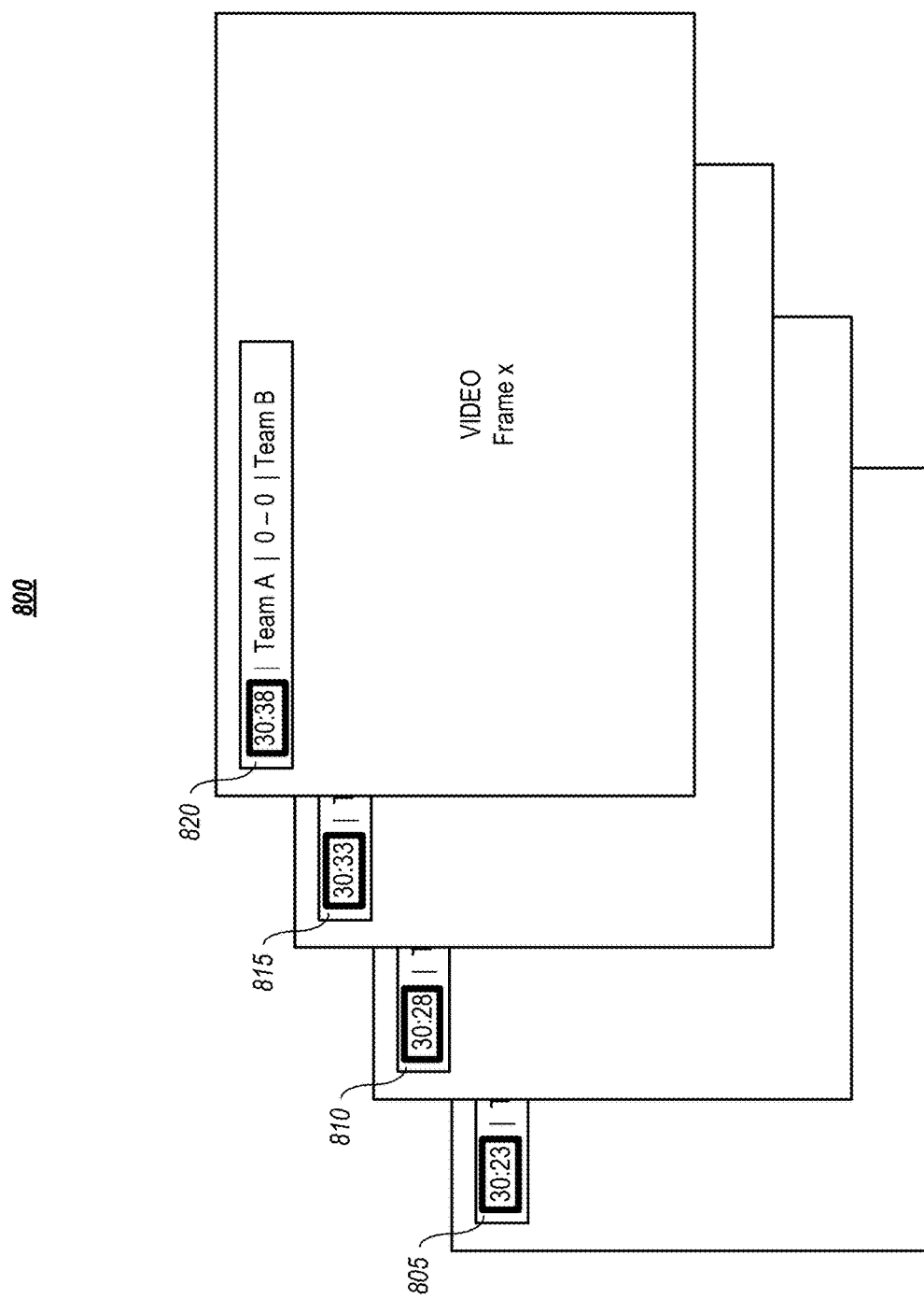
FIG. 8 visualizes an example of recognizing the timer digits in a game video, according to embodiments of the present disclosure.

FIG. 7 depicts a method for event time and video runtime correlating, according to embodiments of the present disclosure. In one or more embodiments, OCR (optical character recognition) was performed (705) on the video frames at the interval of 5 seconds (but other intervals may be used) to read the game clock displayed in the video. The game start time in the video may be deduced (710) from the recognized game clock. Whenever a temporal jump occurred, in one or more embodiments, a record of the game time after the temporal jump was kept (710), and it was called or referred to as a time anchor. With time anchors, in one or more embodiments, any time in the game may be mapped (715) to time in the video (i.e., video runtime), and any clips specified by metadata may be precisely extracted. FIG. 8 visualizes an example of recognizing the timer digits in a game video, according to embodiments of the present disclosure.

As illustrated in FIG. 8, the timer digits 805-820 may be recognized and correlated to the video runtime. Embodiments may collect multiple recognition results over time and may self-correct based on spatial stationarity and temporal continuity.

2. Coarse Interval Extraction Embodiments

FIG. 9 depicts a method for generating clips from an input video, according to embodiments of the present disclosure. In one or more embodiments, metadata from the cloud-sourced game commentaries and labels, which include the timestamps in minutes for the goal events, is parsed (905). Combined with the game start times detected by an embodiment of the OCR tool (discussed above), the raw videos may be edited to generate an x-second (e.g., 70 seconds) candidate clip containing an event of interest. In one or more embodiments, the extracting rule may be described by the following equations:

$$t_{\{clipStart\}} = t_{\{gameStart\}} + 60 * t_{\{goalMinute\}} - \text{tolerance} \quad (1)$$

$$t_{\{clipEnd\}} = t_{\{clipStart\}} + (\text{base clip length} + 2*\text{tolerance}) \quad (1)$$

In one or more embodiments, given the goal minute $t_{\{goalMinute\}}$ and the game start time $t_{\{gameStart\}}$, clips from the $t_{\{clipStart\}}$ second in the video are extracted. In one or more embodiments, the duration of the candidate clips may be set to 70 seconds (in which the base clip length is 60 seconds and the tolerance is 5 seconds—although it should be noted that different values and different formulations may be used) because this covers the corner cases when the event of interest occurred very close to the goal minute, and it also tolerates small deviations of the OCR detected game start time. In the next section, method embodiments for spotting the goal second (the moment the ball crosses the goal line) in the candidate clips are presented.

3. Multimodal Features Extraction Embodiments

In this section, three embodiments to obtain advanced feature representations from the candidate clips are disclosed.

a) Feature Extraction with Pre-Trained Models Embodiments

Figure 10:
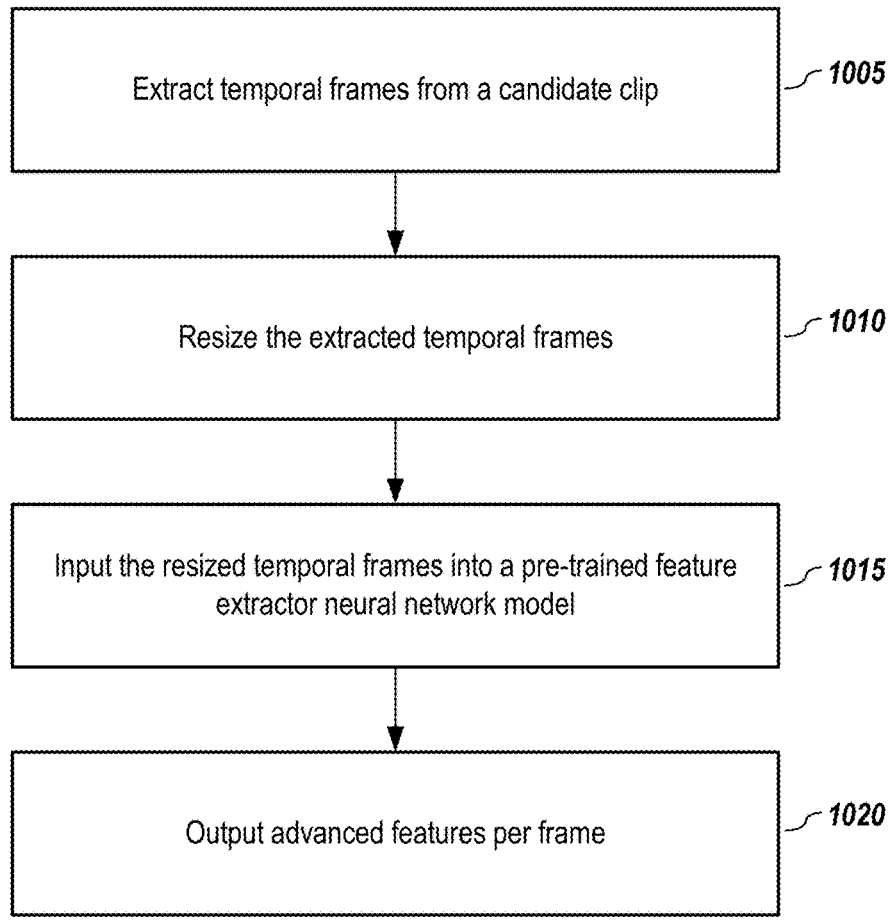
FIG. 10 depicts feature extraction, according to embodiments of the present disclosure.
Figure 11:
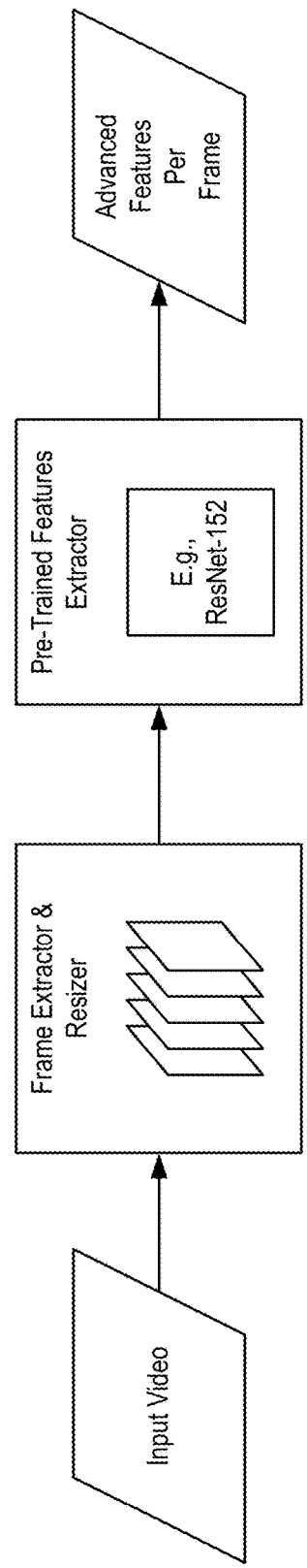
FIG. 11 shows a pipeline to extract features, according to embodiments of the present disclosure.

FIG. 10 depicts feature extraction, according to embodiments of the present disclosure. Given the video data, in one or more embodiments, the temporal frames are extracted (1005) and resized (1010) in the spatial domain, if needed to match in the input size, to feed a deep neural network model to obtain the advanced feature representations. In one or more embodiments, a ResNet-152 model pretrained on an image dataset is used, but other networks may be used. In one or more embodiments, the temporal frames are extracted at the inherent frame per second (fps) of the original video and then downsampled at 2 fps—i.e., ResNet-152 feature representations for 2 frames per second in the raw video are obtained. ResNet is a very deep neural network, which outputs a feature representation of 2048 dimensions per frame at the fully-connected-1000 layer. In one or more embodiments, the output of the layer before the softmax layer may be used as the extracted advanced features. Note the ResNet-152 may be used to extract advanced features from single images; it does not intrinsically embed temporal context information. FIG. 11 shows a pipeline 1100 to extract advanced features, according to embodiments of the present disclosure.

b) Slowfast Feature Extractor Embodiments

Figure 12:
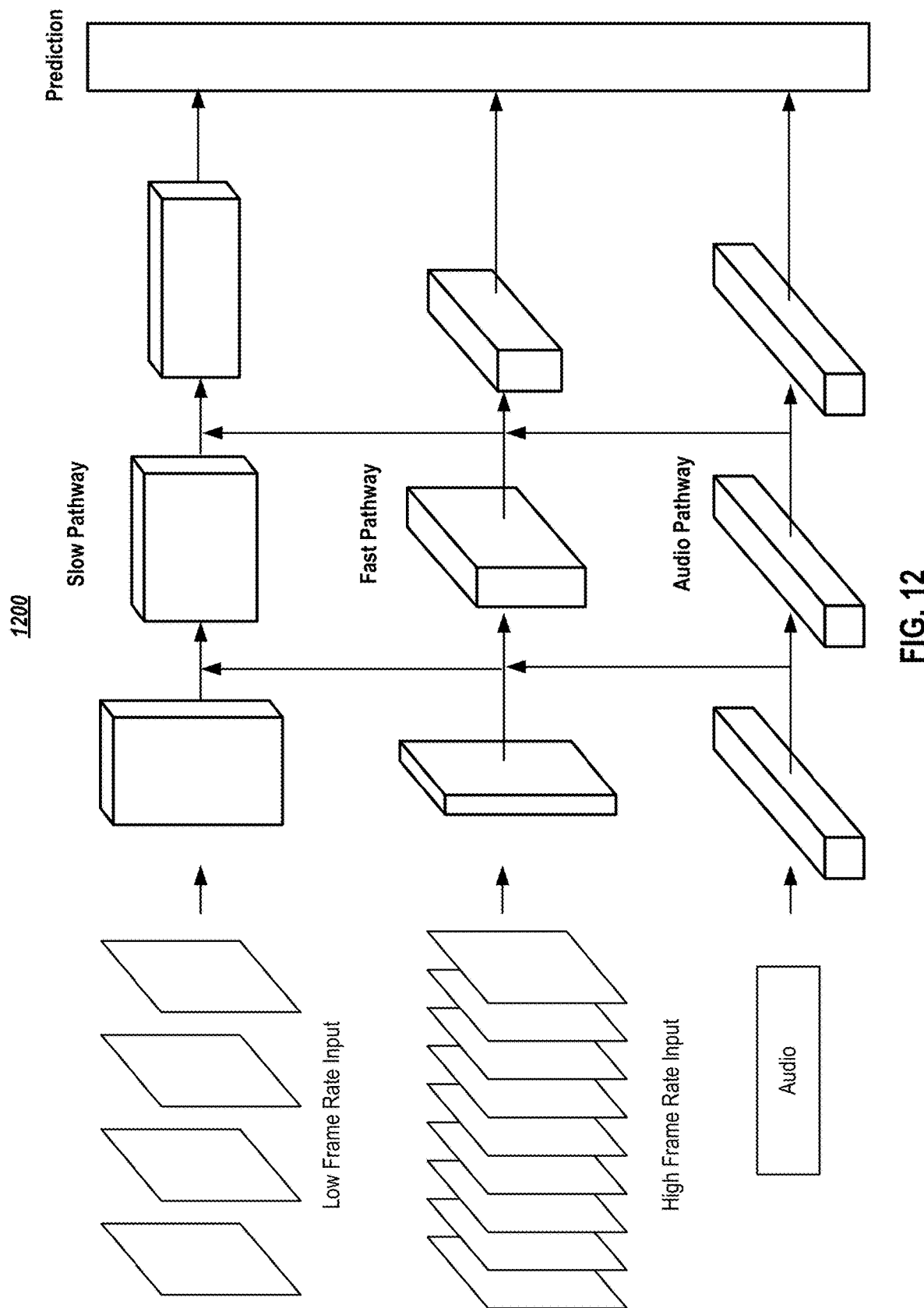
FIG. 12 graphically depicts a neural network model that may be used to extract features, according to embodiments of the present disclosure.

As part of the video features extractor, in one or more embodiments, a Slowfast network architecture—such as like that proposed by Feichtenhofer et al. (Feichtenhofer, C., Fan, H., Malik, J., & He, K., Slowfast Networks for Video Recognition, In *Proceedings Of The IEEE International Conference On Computer Vision* (pp. 6202-6211) (2019), which is incorporated by reference herein in its entirety) or by Xiao et al. (Xiao et al., Audiovisual SlowFast Networks for Video Recognition, available at arxiv.org/abs/2001.08740v1 (2020), which is incorporated by reference herein in its entirety)—may be used; although it shall be noted that other network architectures may be used. FIG. 12 graphically depicts a neural network model that may be used to extract features, according to embodiments of the present disclosure.

Figure 13:
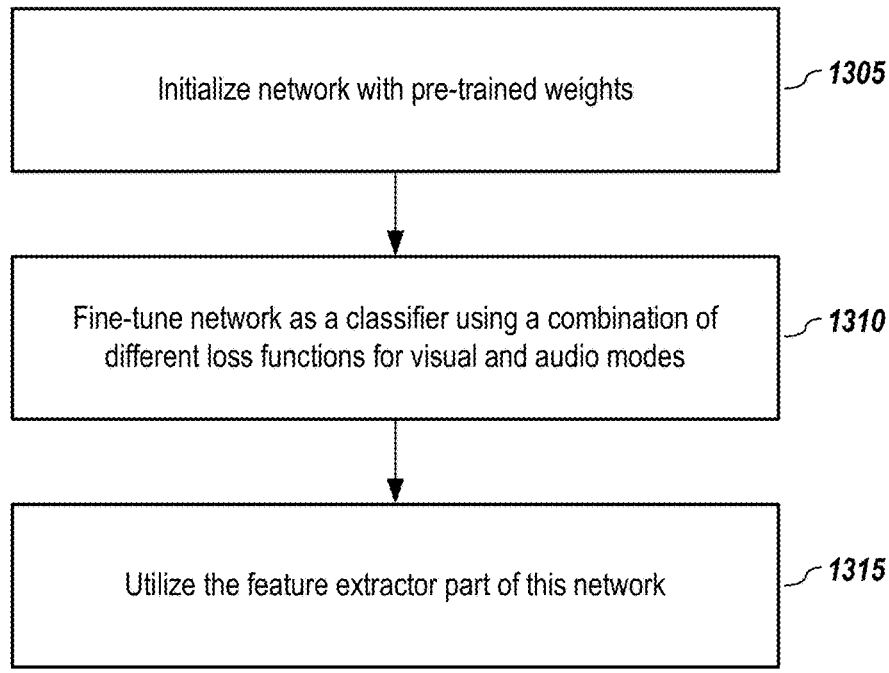
FIG. 13 depicts feature extraction using a Slowfast neural network model, according to embodiments of the present disclosure.

FIG. 13 depicts feature extraction using a Slowfast neural network model, according to embodiments of the present disclosure. In one or more embodiments, a Slowfast network is initialized (1305) with pre-trained weights using a training dataset. The network may be finetuned (1310) as a classifier. The second column in TABLE 1, below, shows the events classification results using the baseline network with a test data set. In one or more embodiments, the feature extractors are used to classify 4-second clips into 4 categories: 1) far from the event of interest (e.g., a goal), 2) just before the event of interest, 3) the event of interest, and 4) just after the event of interest.

Several techniques may be implemented to find the best classifier, which is evaluated by the top 1 error percentage. First, a network like that constructed in FIG. 12 is applied, which adds audio as an extra pathway to the Slowfast network (AVSlowfast). The network's visual part may be initialized with the same weights. One can see that direct joint training of visual and audio features hurts the performance. This is discovered as a common issue when training the multimodal networks. In one or more embodiments, a technique of adding different loss functions for visual and audio modes respectively was applied, and the whole network was trained with a multi-task loss. In one or more embodiments, a linear combination of cross-entropy losses on the audio-visual result and each of the audio and visual branches may be used. The linear combination may be a weighted combination in which the weights may be learned or may be selected as hyperparameters. The best top 1 error result shown in the bottom row in Table 1 were obtained.

TABLE 1

| Results on event classification. | |
|---|---|
| Algorithms | Top 1 error % |
| Slowfast | 33.27 |
| Audio only | 60.01 |
| AVSlowfast | 40.84 |
| AVSlowfast multi-task | 31.82 |

In one or more embodiments of the goal spotting pipeline, one may take advantage of the feature extractor part of this network (AVSlowfast with multi-task loss). Therefore, an aim is to lower the top 1 error, which corresponds to stronger features.

c) Mean-Abs Audio Feature Embodiments

By listening to the soundtrack of an event (e.g., a game play without live commentary), people can often decide when an event of interest has occurred simply according to the volume of the audience. Inspired by this observation, a simple approach to extract the key information about events of interest from the audios directly was developed.

Figure 14:
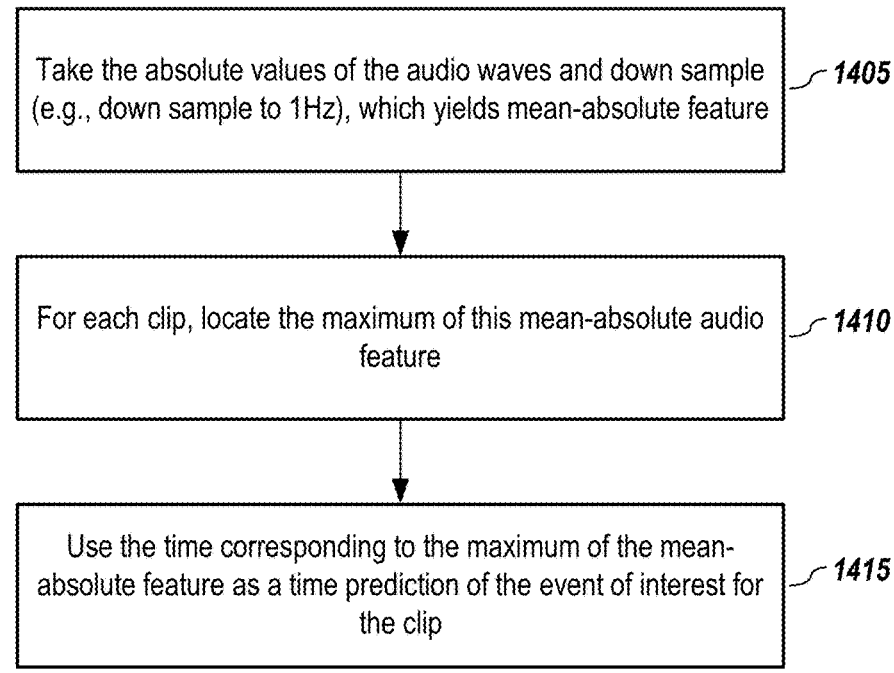
FIG. 14 depicts a method for audio feature extraction and event of interest time prediction, according to embodiments of the present disclosure.
Figure 15A:
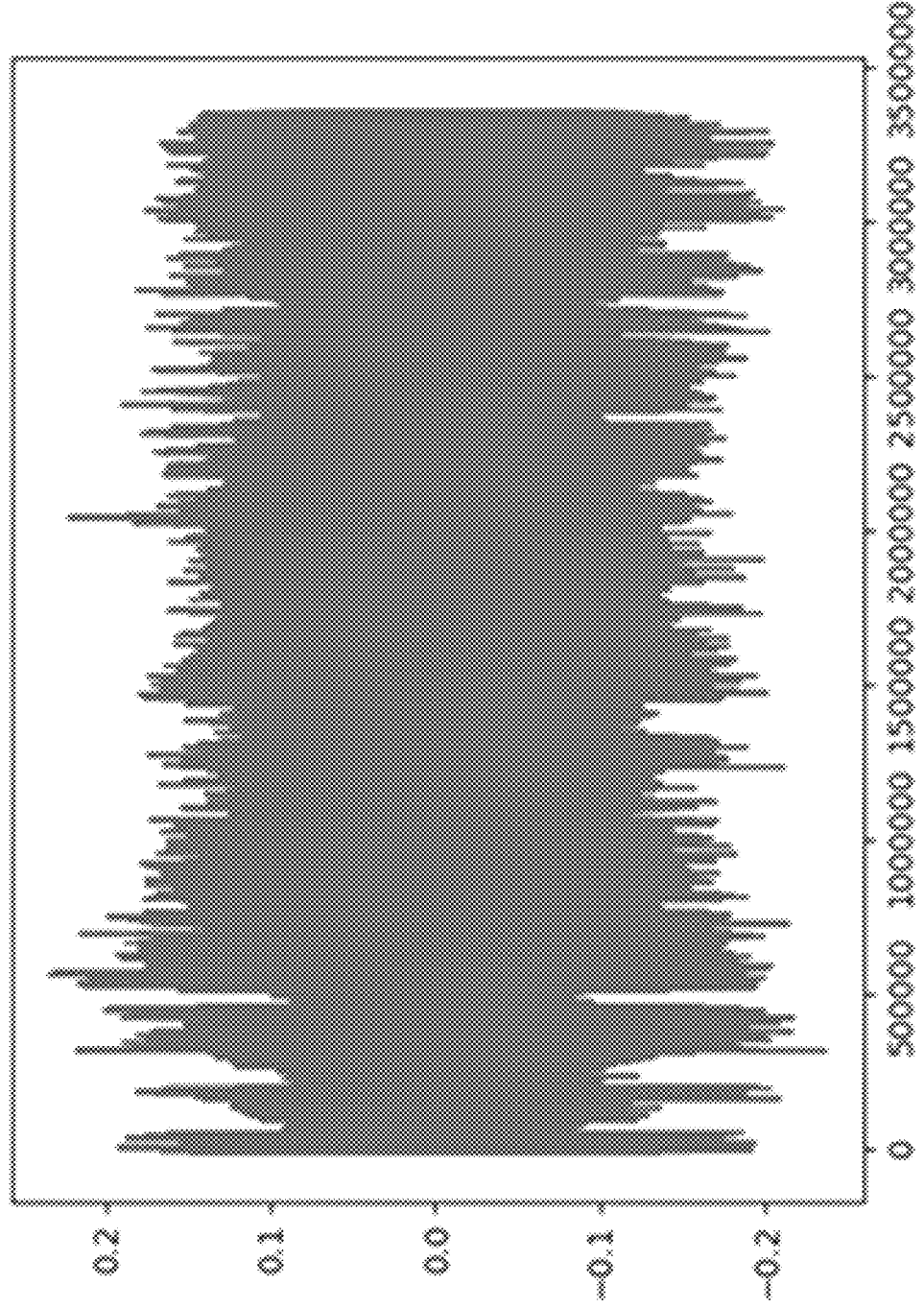
FIG. 15A shows an example of a raw audio wave.
Figure 15B:
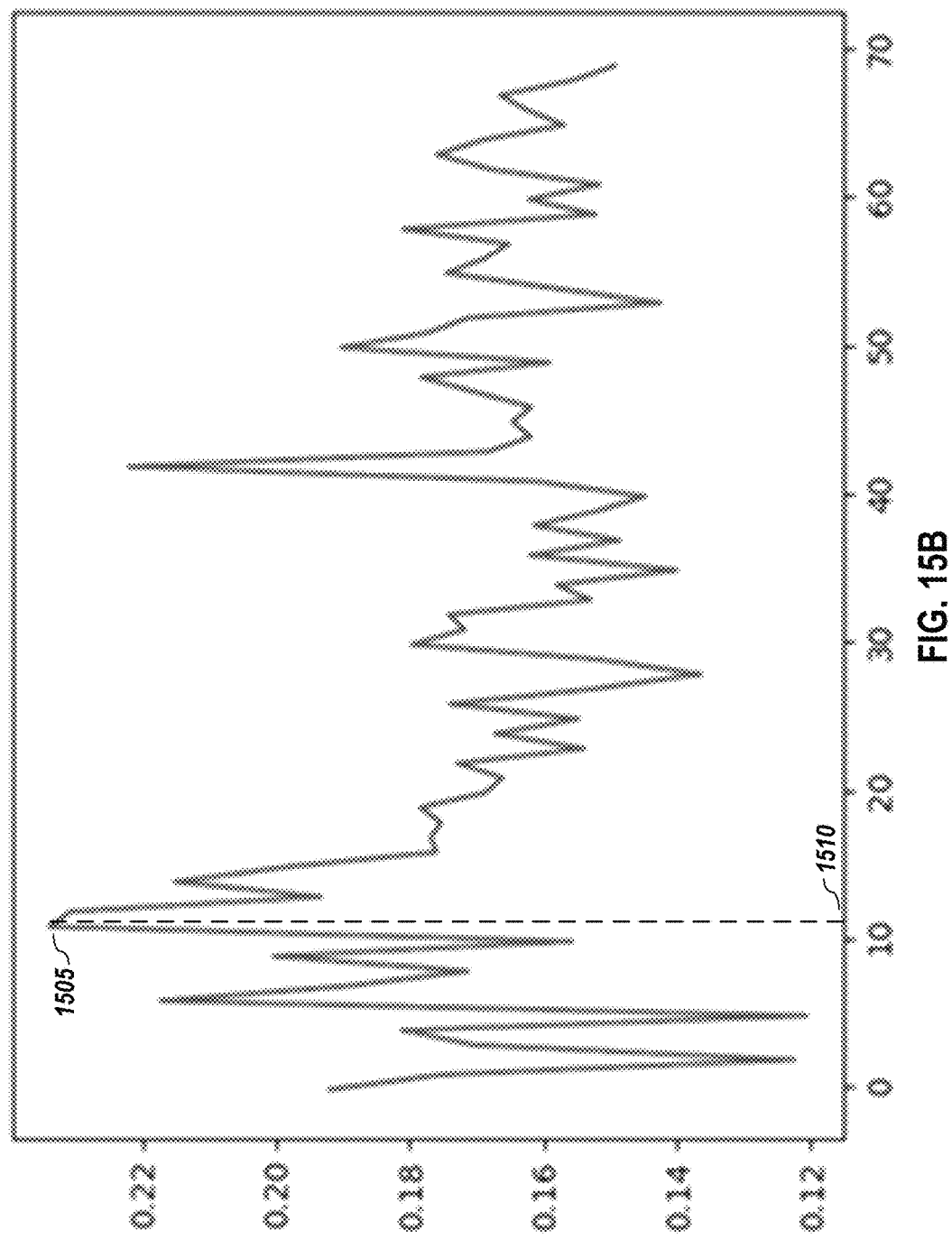
FIG. 15B shows its corresponding mean-abs feature, according to embodiments of the present disclosure.

FIG. 14 depicts a method for audio feature extraction and event of interest time prediction, according to embodiments of the present disclosure. In one or more embodiments, the absolute values of the audio waves are taken and down-sampled (1405) to 1 Hertz (Hz). This feature representation may be referred to as the mean-abs feature, as it represents the mean sound amplitude at each second. FIGS. 15A & 15B show an example of one clip's raw audio wave and its mean-abs feature, respectively, according to embodiments of the present disclosure.

For each clip, the maximum 1505 of this mean-absolute audio feature 1500B may be located (1410). By locating the maximum (e.g., maximum 1505) of this mean-abs audio feature and its corresponding time (e.g., time 1510) for clips in the test data set, a 79% accuracy (under 5 seconds tolerance) in event temporal localization was achieved.

In one or more embodiments, the mean-absolute audio feature (e.g., 1500B in FIG. 15B) may be treated as a likelihood prediction of the event of interest for the times in the clip. As will be discussed below, this mean-absolute audio feature may be a feature input into an ensemble model that predicts a final time within the clip of the occurrence of the event of interest.

4. Action Spotting Embodiments

To precisely spot the moment of a goal in soccer game videos, in one or more embodiments, temporal context information around the moment is incorporated to learn what happened in the videos. For example, before a goal event occurs, the goal player will shoot the ball (or a header) and the ball will move towards the goal gate. In some scenarios, the attacking and defensive players are gathered in the penalty area and are not far from the goal gate. After the goal event, usually the goal player will run to the sideline, hug teammates, and there will also be a celebration among the spectators and among the coaches. Intuitively, these patterns in the video can help the model to learn what happened and spot the moment of the goal event.

Figure 16:
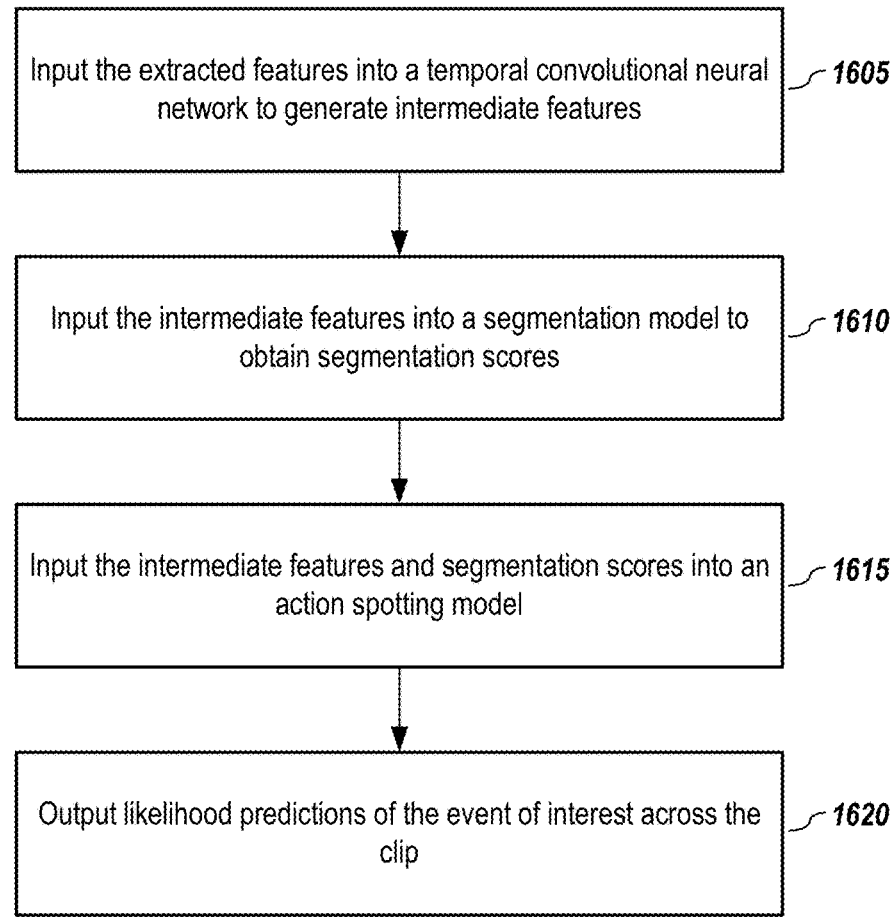
FIG. 16 depicts a method for predicting the time of an event of interest in a video, according to embodiments of the present disclosure.

FIG. 16 depicts a method for predicting likelihood of an event of interest in a video clip, according to embodiments of the present disclosure. In one or more embodiments, to construct a temporal localization model, a temporal convolution neural network, which takes the extracted visual features as the input, is used (1605). In one or more embodiments, the input features may be the extracted features from one or more of the prior models discussed above. For each frame, it outputs a set of intermediate features, which mixes temporal information across the frames. Then, in one or more embodiments, the intermediate features are input (1610) into a segmentation module that generates segmentation scores, which are assessed by a segmentation loss function. A cross-entropy loss function may be used for a segmentation loss function:

$$L = -\sum_{i=1}^{n} t_i \log(p_i)$$

where $t_i$ is the ground truth label, and $p_i$ is the softmax probability for the ith class.

In one or more embodiments, the segmentation scores and the intermediate features are concatenated and fed (1615) into an action spotting module, which generates (1620) the spotting predictions (e.g., likelihood predictions across the span of the clip of the event of interest occurring at each time instant), which may be assessed through a YOLO-like action spotting loss function. An L2 loss function may be used for an action spotting loss function:

$$L = \sum_{i=1}^{n} (y_{true} - y_{predicted})^2$$

Figure 17:
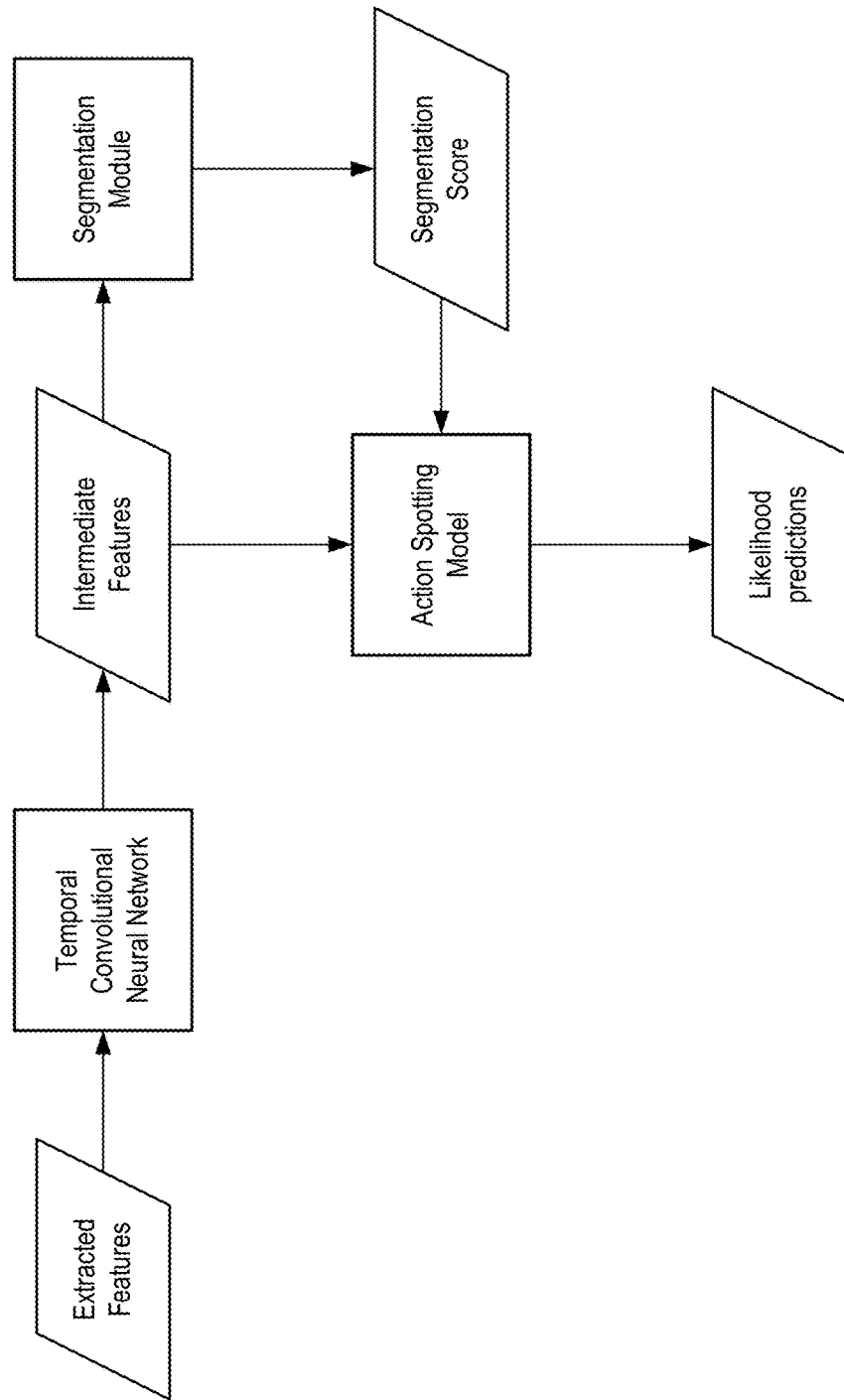
FIG. 17 illustrates a pipeline for temporal localization, according to embodiments of the present disclosure.

FIG. 17 illustrates a pipeline for temporal localization, according to embodiments of the present disclosure. In one or more embodiments, the temporal CNN may comprise convolution layers, the segmentation module may comprise convolutional layers and batch normalization layers, and the action spotting model may comprise pooling layers and convolutional layers.

In one or more embodiments, the model embodiment is trained with the segmentation and action spotting loss function as described by Cioppa et al. (A., Deliège, A., Giancola, S., Ghanem, B., Droogenbroeck, M. V., Gade, R., & Moeslund, T. in "A Context-Aware Loss Function for Action Spotting in Soccer Videos," 2020 *IEEE/CVF Conference on Computer Vision and Pattern Recognition (CVPR)*, 13123-13133, which is incorporated by reference herein in its entirety) considering the temporal context information. In one or more embodiments, segmentation loss is used to train the segmentation module, where each frame is associated with a score to represent how likely the frame belongs to an action class, while the action spotting loss is used to train the action spotting module, where a temporal location is predicted for an action class.

At least one of the major differences between embodiments herein and the approach of Cioppa et al. is that embodiments herein deal with short clips, while Cioppa et al. take the entire game videos as the input and thus it requires much longer time to process the video and extract features when implemented in real-time.

Figure 18:
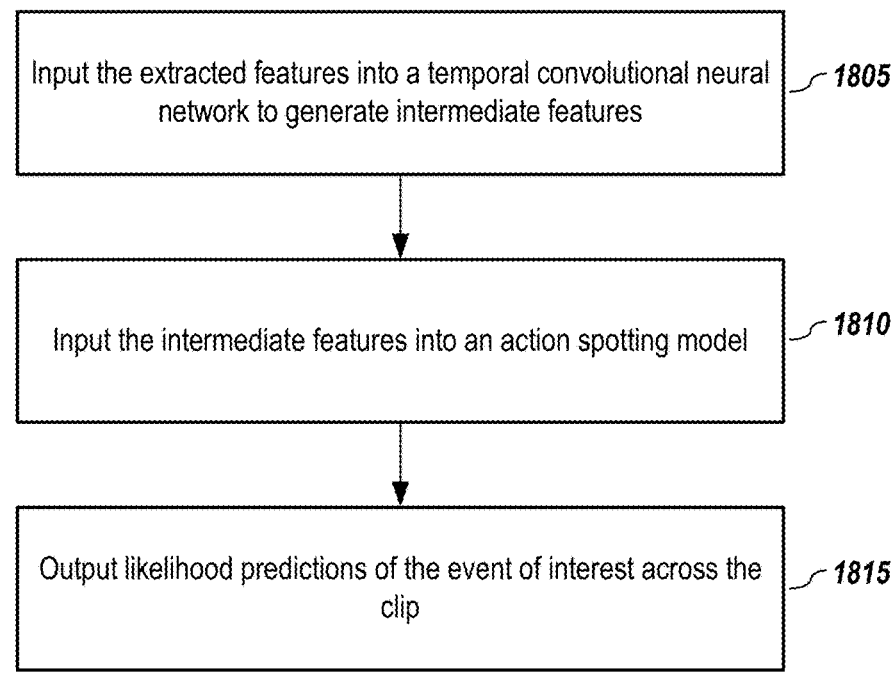
FIG. 18 depicts a method for predicting likelihood of an event of interest in a video clip, according to embodiments of the present disclosure.
Figure 19:
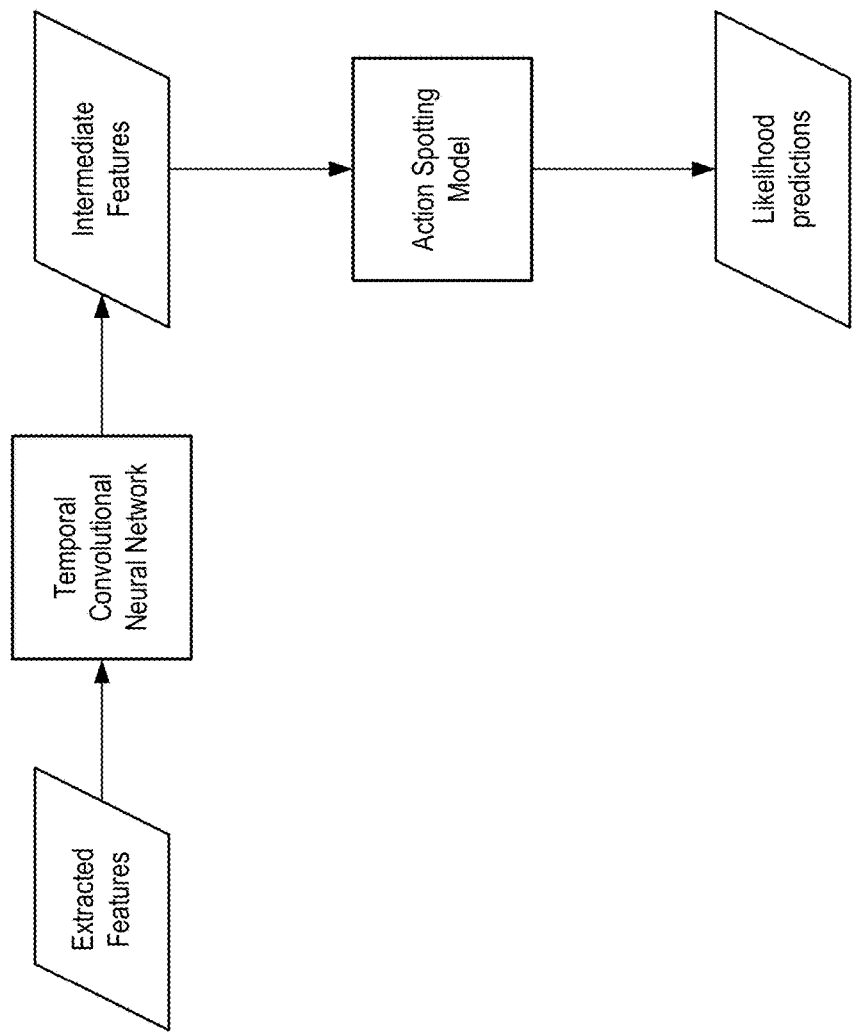
FIG. 19 illustrates a pipeline for action spotting prediction, according to embodiments of the present disclosure.

In one or more embodiments, the extracted features input may be the extracted features from the ResNet model discussed above or the AVSlowFast multi-task model discussed above. Alternatively, for the AVSlowFast multi-task model, the segmentation parts of the action spotting model may be removed. FIG. 18 depicts a method for predicting likelihood of an event of interest in a video clip, according to embodiments of the present disclosure. In one or more embodiments, a temporal convolution neural network receives (1805) as input the extracted features from the AVSlowfast multi-task model. For each frame, it outputs a set of intermediate features, which mixes temporal information across the frames. Then, in one or more embodiments, the intermediate features are input (1810) into an action spotting module, which generates (1815) the spotting predictions (e.g., likelihood predictions across the span of the clip of the event of interest occurring at each time instant), which may be assessed through an action spotting loss function. FIG. 19 illustrates a pipeline for action spotting prediction, according to embodiments of the present disclosure.

5. Ensemble Learning Embodiments

In one or more embodiments, a single predicted time for the event of interest in the clip may be obtained from each of the three models discussed above (e.g., picking a maximum value). One of the predictions may be used or the predictions may be combined (e.g., averaged). Alternatively, an ensemble model may be used to combine information from each of the models in order to obtain a final prediction of the event of interest in the clip.

Figure 20:
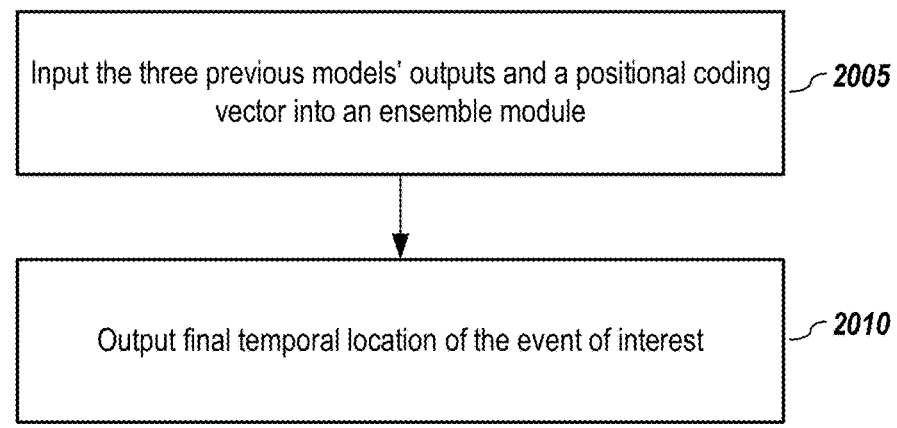
FIG. 20 depicts a method for predicting likelihood of an event of interest in a video clip, according to embodiments of the present disclosure.
Figure 21:
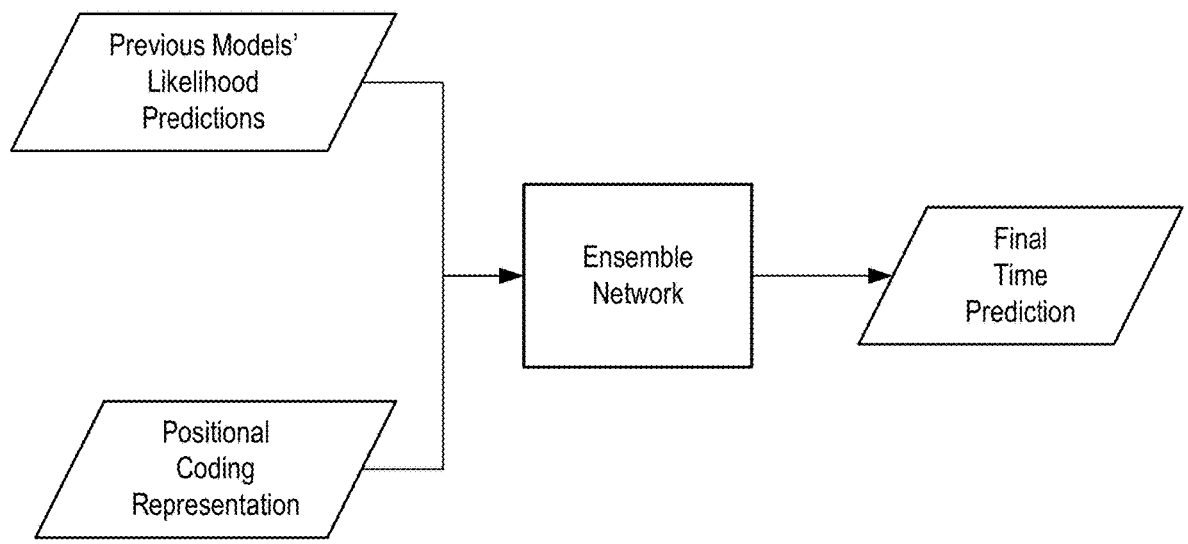
FIG. 21 illustrates a pipeline for final time prediction using an ensemble neural network model, according to embodiments of the present disclosure.

FIG. 20 depicts a method for predicting likelihood of an event of interest in a video clip, according to embodiments of the present disclosure, and FIG. 21 illustrates a pipeline for final time prediction, according to embodiments of the present disclosure. In one or more embodiments, the final accuracy may be enhanced in an ensemble fashion, aggregating the output of the three models/features described in the above subsections. In one or more embodiments, all three previous models' outputs, together with a positional coding vector, may be combined as the input (2005) of the ensemble module. The combining may be done using concatenation, e.g., 4 d-dimension vectors become a 4×d matrix. For the ResNet and the AVSlowfast multi-task models, the input may be their likelihood prediction outputs from their action spotting models of Section 5, above. And, for the audio, the input may be the mean-absolute audio feature of the clip (e.g., FIG. 15B). In one or more embodiments, the positional coding vector is a 1-D vector representing the time length of the clip (i.e., an index).

In one or more embodiments, a core of the ensemble module is an 18-layer 1-D ResNet with a regression head. Essentially, the ensemble module learns a mapping from multidimensional input features comprising multiple modalities to the final temporal location of the event of interest in the clip. In one or more embodiments, the final time value prediction from the ensemble model is output (2010) and may be compared with the ground truth time to compute a loss. The losses of the various clips may be used to update the parameters of the ensemble model.

6. Inference Embodiments

Once trained, the overall highlight generating system, such as depicted in FIG. 1, may be deployed. In one or more embodiments, the system may additionally include an input that allows a user to select one or more parameters for the generated clips. For example, the user may select a specific player, a span of games, one or more events of interest (e.g., goals and penalties), and the number of clips that make the highlight video (or a length of time for each clip and/or the overall highlight compilation video). The highlight generating system may then access videos and metadata and generate the highlight compilation video by concatenating the clips. For example, the user may want 10 seconds per event of interest clip. Thus, in one or more embodiments, the customized highlight video generation module may take the final predicted times for clips and select 8 seconds before the event of interest and 2 seconds after. Alternatively, as illustrated in FIG. 1, key events of a player's career may be the events of interest and they may be automatically identified and compiled into a "story" of the player's career. Audio and other multimedia features may be added to the video by the customized highlight video generation module, which audio and features may be selected by the user. One skilled in the art shall recognize other applications of the highlight generation system.

D. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

1. Goal Spotting

For a fair comparison with the existing works, the tested model embodiments were trained with candidate clips containing goals extracted from games in the train set of a dataset and validated/tested with candidate clips containing goals extracted from games in the valid/test set of the dataset.

Figure 22:
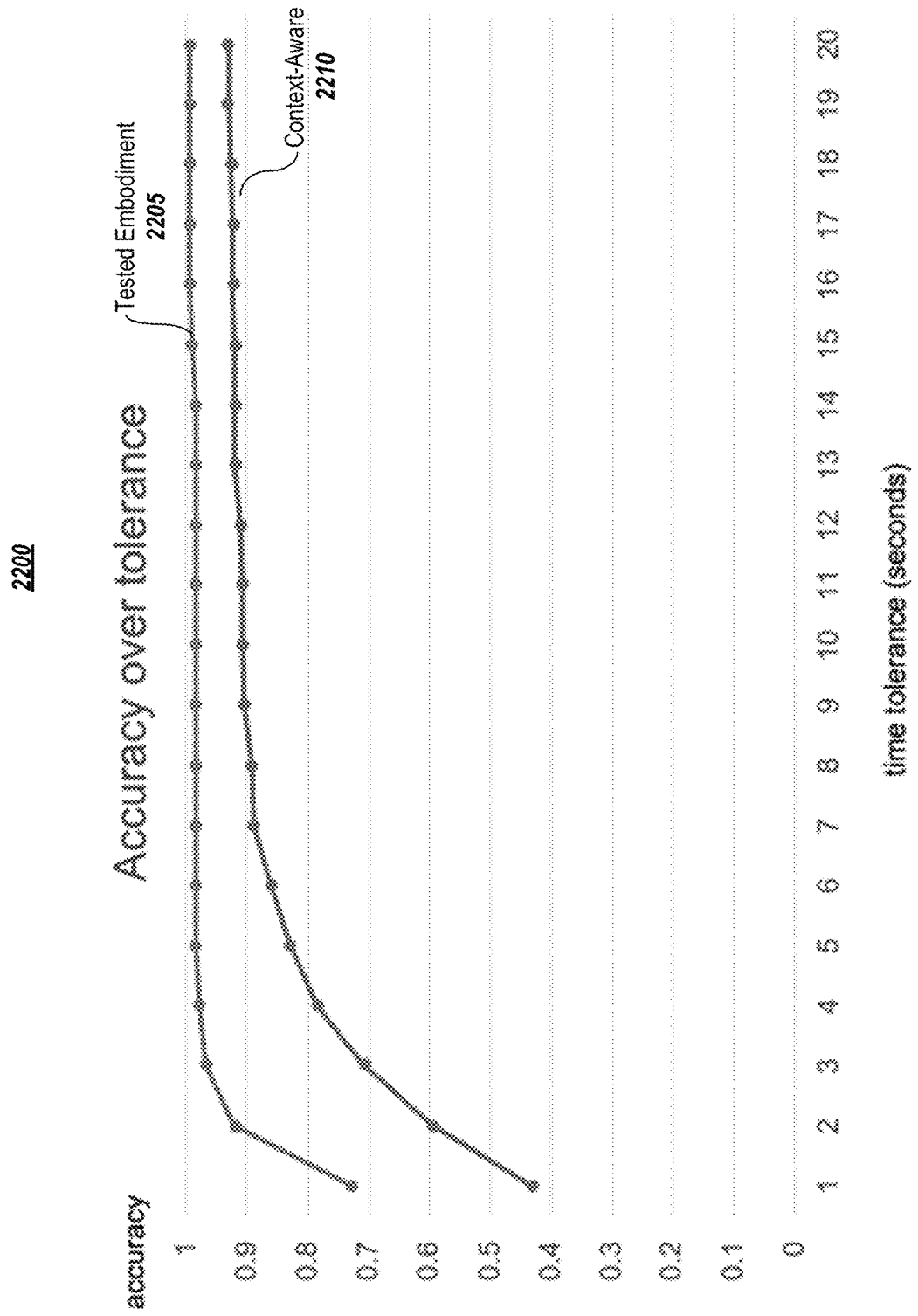
FIG. 22 depicts goal spotting results compared to another method, according to embodiments of the present disclosure.

FIG. 22 shows a main result: to spot the goals in 70-second clips, the tested embodiment 2205 significantly outperforms the current state-of-the-art method 2210 referred to as the Context-Aware approach in spotting goals in soccer.

Figure 23:
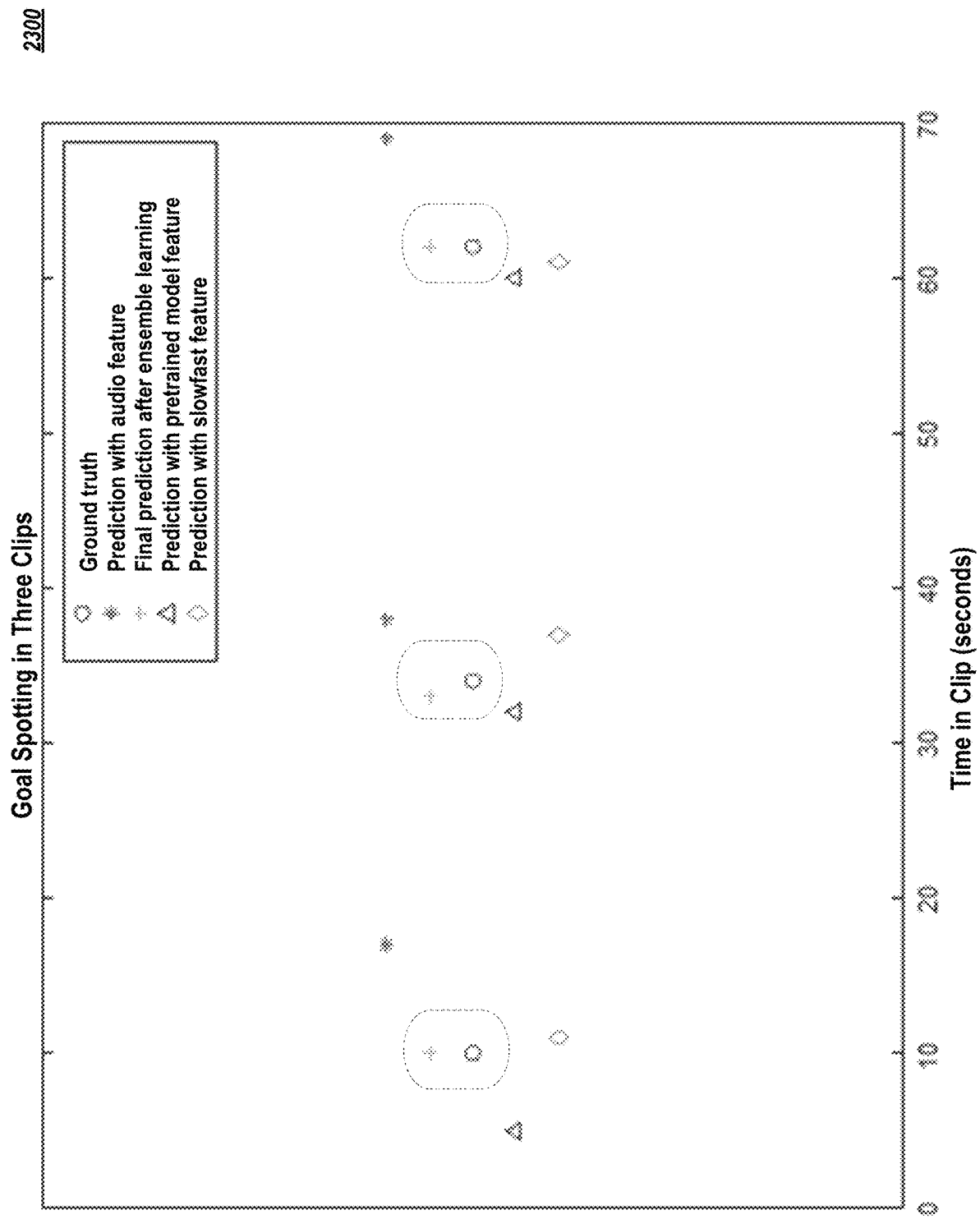
FIG. 23 shows goal spotting results for three (3) clips, according to embodiments of the present disclosure. Ensemble learning achieves the best results.

The intermediate prediction results are also shown, which were obtained by using three different features described in Section C.3 or C.4 and the final results predicted by the ensemble learning module described in Section C.5. The goal spotting results for 3 clips were stacked in the FIG. 23. As shown in FIG. 23, the final prediction outputs by the ensemble learning module embodiment are the best in terms of their closeness to the ground truth labels (illustrated with the dashed line ovals).

2. Some Notes

As shown in FIG. 22, embodiments can achieve close to 1 accuracy (0.984) with a tolerance of 5 seconds. This result is phenomenal since it can be used to correct mislabeling from text and sync with customized audio commentaries. It also helps to generate highlights precisely, and thus gives users/editors options to customize their videos around the exact goal moment. The pipeline embodiments may be naturally extended to catch the moment of other events such as corners, free kicks, and penalties.

It is again reiterated that the use of a soccer game as the overall content and the goal as the event within that content is by way of illustration only, and one skilled in the art shall recognize that aspects herein may be applied to other content domains, including outside of the gaming domain, and to other events.

E. Alternative Embodiments of Highlight Video Generation from Text and Video Inputs As previously noted, an application of the systems and methods disclosed above is the ability to generate videos of the highlights. For example, it would be very beneficial to be able to automate the generation of event highlight video generation, such as sports highlight videos with commentary. As noted above, the demand for video content is ever-increasing, and video content generation takes much longer than generating article-based content. Previously, generating such as video was a manual process, in which the video editing took a substantial amount of time. Embodiments herein make it easier to generate a highlight video, where an input text, such as a summary article of a match, is used in generating corresponding video content. In one or more embodiments, artificial intelligence/machine learning is used to find, match, or generate a video clip corresponding to text about that part of the video; thus, once a text article is written, a video may be generated, in which the process of generating such a highlight video is reduced to writing an article and using an embodiment of the automated system to edit raw video to generate the highlight video.

Figure 24A:
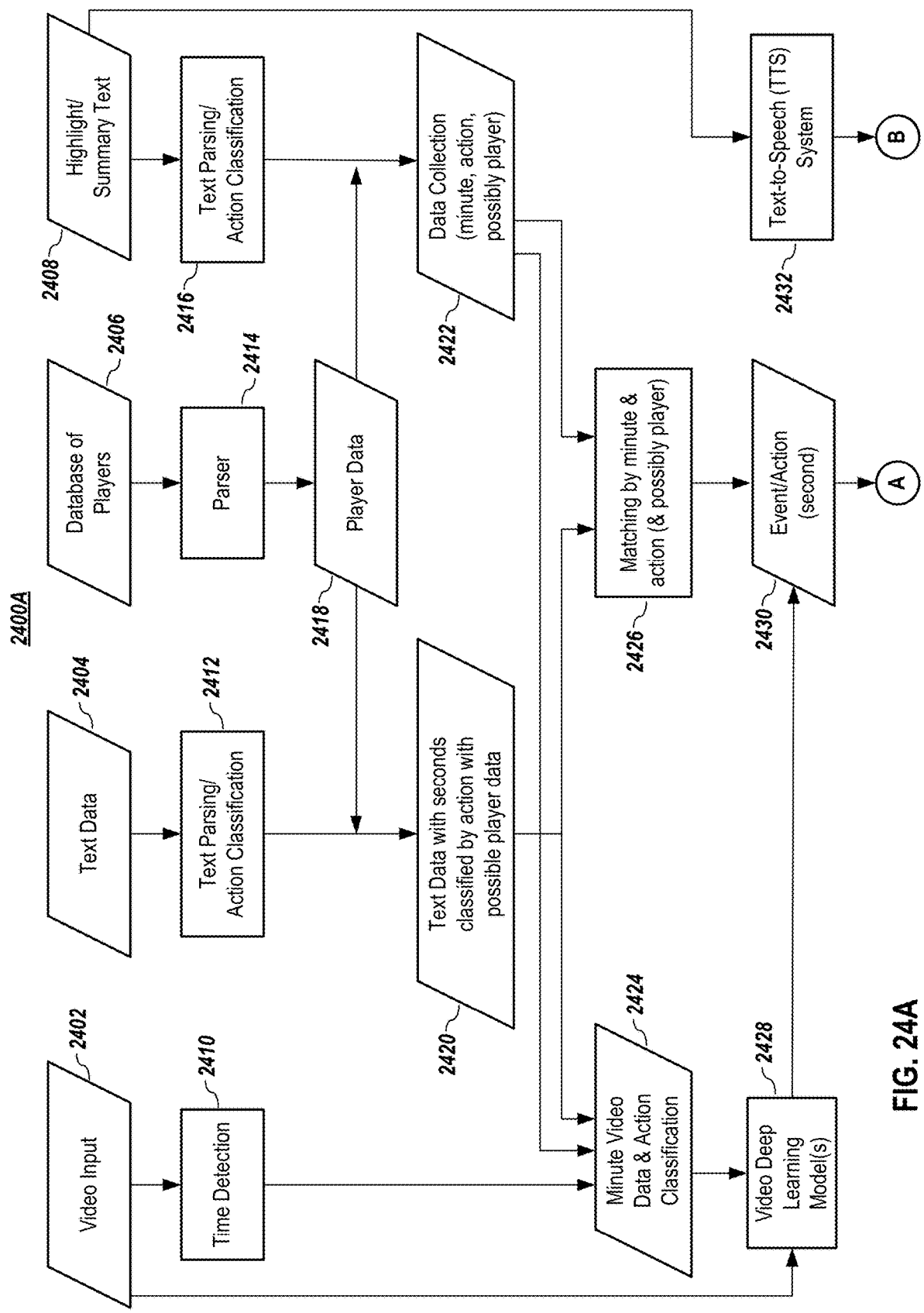
FIGS. 24A & B depict a system for generating a summary or highlight video from a video input and a text summary input, according to embodiments of the present disclosure.

FIGS. 24A & B depict a system for generating a highlight video of an event or events from video and text, according to embodiments of the present disclosure. As illustrated, the system 2400 may receive as inputs an article or a piece of text 2408 describing the game and one or more videos 2402 of the whole match. Note that for sake of illustration, the activity is a sports game, but it shall be noted that other activities (e.g., presentations, rallies, newscasts, concerts, etc.) may be used.

Figure 25:
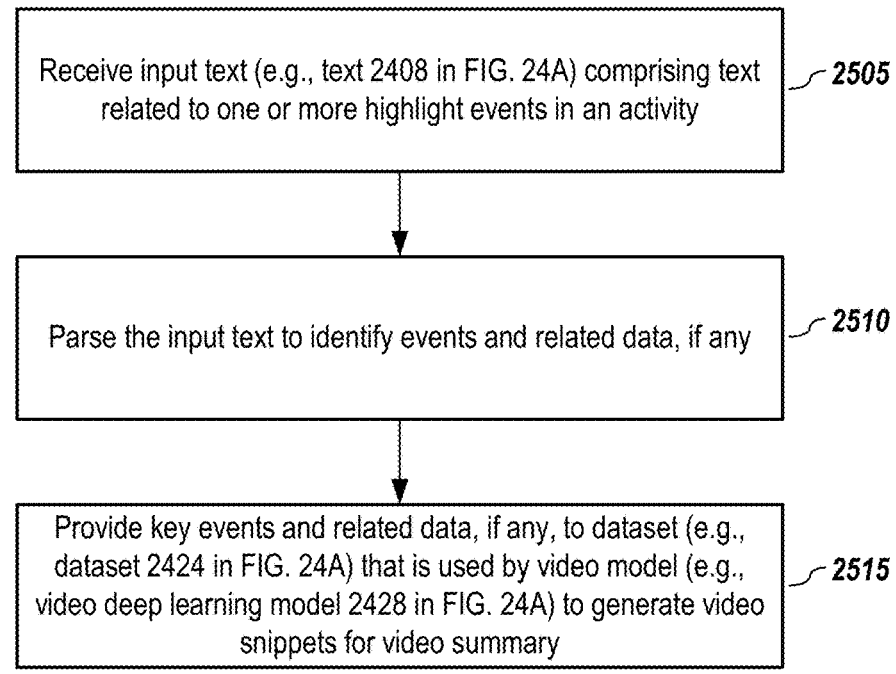
FIG. 25 depicts a method for extracting information from the input text, according to embodiments of the present disclosure.

Returning to FIG. 24A, one task of the disclosed system is to identify the correct portion or portions in the video 2402 that correspond to the elements noted in the input text 2408. FIG. 25 depicts a method for extracting information from the input text, according to embodiments of the present disclosure. As depicted, an input text (e.g., text 2408 in FIG. 24A) comprising text related to one or more highlight events in an activity is received (2505). For example, the input text may be an article summarizing a game and the article will become the basis for the final summary video output by the system. To aid the video snippet selection, the input text is parsed (2510) to identify events and related data, if any. In one or more embodiments, the parsing may be rules-based (e.g., pattern matching, keyword matching, etc.), may employ a machine learning model or models, such as a neural network model trained to extract, or both to extract and classify key data such as: number of events, minute/time event occurred, type of event/action, player, and other identified information (who, what, where, when, etc.). Some examples of template matching are provided below:

Corner, Arsenal. Conceded by Adam Weber.:→Contains the keyword "corner" and is classified as a corner action, and the player extracted is Adam Weber.

Paul Grom (Brighton and Hove Albion) wins a free kick in the defensive half: This is classified as a free-kick action. The player is Paul Grom.

Goal! Arsenal 1, Brighton and Hove Albion 0. Nicolas Pem (Arsenal) right-footed shot from the center of the box to the bottom right corner. Assisted by Clark Kamers with a cross.: This contains the keyword "Goal," and the word "shot," so this would be classified as both a goal and shot event. The player would be Nicolas Pem.

In one or more embodiments, the extracted information comprising key events and related data, if any, is provided to a dataset (e.g., dataset 2424 in FIG. 24A) that is used by a video model (e.g., video deep learning model 2428 in FIG. 24A) to generate video snippets for a video summary.

As illustrated in FIG. 24A, the data may be combined with extracted text data from other sources. For example, text data 2404 may be collected from online postings, social media (e.g., Facebook, Twitter, etc.), high frequency or play-by-play texts, news feeds, forums, user groups, etc. In one or more embodiments, this text data may be parsed and classified using the same or similar rule-based or neural network models or may use different rule-based models or neural network models that more closely fit with the input text data. Often, web or user-generated content of high frequency (live) text data describing game actions includes timing information that may also be extracted and used to help identify the correct time in a video. This additional text data 2404 may be parsed and classified into a collection of groups of sentences containing minute, action, and possibly other data, such as player data, time, etc. Each sentence or group of sentences describes an event during the game. Thus, text parsing/action classification models 2412 and 2416 may be the same or different models. Note that this source of information 2404 provides additional information to help extract the correct events from the input summary text 2408.

Figure 26:
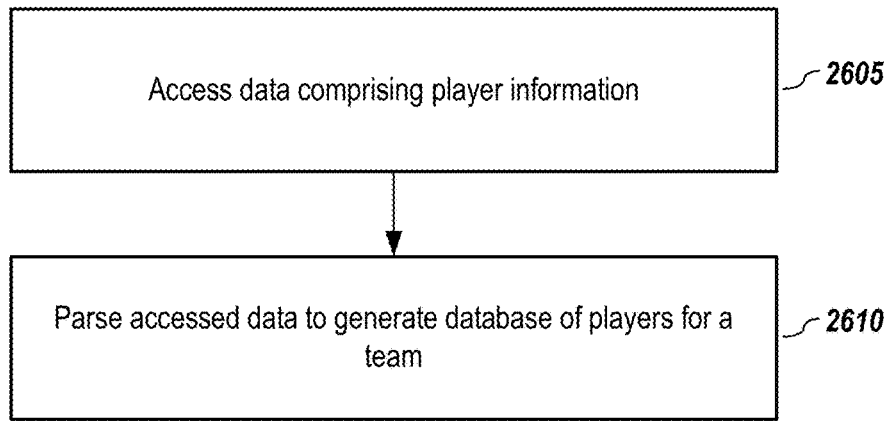
FIG. 26 depicts a method for generating a player database, according to embodiments of the present disclosure.

Note that additional data inputs may also be used to help with the parsing and/or video summary generation. Consider, by way of example, that the system 2400 may use a database of player data 2406, in which the system may crawl the web or use user-generated content for players' information. This information may also be parsed using a parse 2414, which may use the same or similar rule-based or neural network models or may use different rule-based models or neural network models that more closely fit with the input text data. Consider, for example, the method depicted in FIG. 26.

In one or more embodiments, the parser module 2414 may normalize table information and stores entity information, such as teams, players, performers, bands, organizations, etc. For instance, a list of players for a team, which listing may be available at a team website, may include (2605) a listing of the players by their number and name. The parser may extract (2610) the rows and get player names and jersey numbers, resulting in a database with the numbers and the names of players for that team. The output is a player dataset 2418 that may be used to help supplement the parsed data (i.e., the text data with seconds classified by action with possible player data 2420 and data collection (e.g., minute, action, possibly other related data) 2422). It shall be noted that similar actions can be taken for other entities, such as performers, actors, presenters, etc. of an activity.

Returning to FIG. 24A, given the input video 2402, the time detection module 2410 correlates the runtime of the video with the game time. In one or more embodiments, the time detection may be performed as discussed above with respect to time anchoring, although other methods may be used.

As illustrated in the embodiment in FIG. 24A, the system 2400 may comprise a matching by minute and action module 2426 that may also help identify timing information for events. For example, for each group of sentences describing an event, the module 2426 may match the sentence to the high-frequency text data, and thereby obtain the second in which the action happened. In one or more embodiments, the model may also correlate additional related data, such as the player(s). Information from the other datasets (i.e., dataset 2420 and dataset 2422) may be provided to the module 2426, which uses the information for matching.

For instance, in the match summary, in minute 4, Arsenal obtained a corner, and the live stream data includes the following:

3'30" Foul by Bukayo
4'5" Adam Weber passed the ball.
4'12" Nicolas Pem scored a shot.
4'25" Pascal was fouled by Adam.
4'37" Arsenal Corner, conceded by Adam Weber.
5'10" Substitution, Arsenal. Sam Bukayo replaces Emil Bowe In this instance, the match summary data of interest occurred in minute 4, and the action is a corner kick. In one or more embodiments, the matching model embodiment filters the live data and keep all minute 4 data which is:

4'5" Adam Weber passed the ball.
4'12" Nicolas Pem scored a shot.
4'25" Pascal was fouled by Adam.
4'37" Arsenal Corner, conceded by Adam Weber.

Then, by the text parsing module mentioned above, the actions are knowns: pass, goal, foul, and corner. Thus, the module 2426 may match to "4'37" Arsenal Corner, conceded by Adam Weber," if that is the event of interest. In one or more embodiments, this information may also be provided to the action module 2430, which uses the timing information to generate corresponding video snippets.

As illustrated in the embodiment FIG. 24A, a dataset 2424 that comprises the approximate minute timing of when an event or events occurred and the classification of those events is compiled. In the depicted embodiment, the data set 2424 may be a compilation of information from the time detection module 2410, the text data information 2420, and the data collection information 2422. This information may then be used by the video deep learning model(s) 2428 to pinpoint a more precise time in the video in order to generate corresponding video snippets that incorporate the event(s) of interest. The model(s) 2428 may be one or more of the models discussed above or an ensemble as discussed above.

For example, in one or more embodiments, for each group of sentences describing an event, the sentence may contain which minute the action happened. The system may extract a minute (or more) of video from the input video, and, in one or more embodiments, one or more deep learning video understanding models are used to identify at which second(s) the event/action occurred. As noted above, the model(s) may be one or more of the models discussed above or an ensemble of all or a subset thereof.

In one or more embodiments, the output of the module 2428 is a set 2430 of identified actions/events and the timing (in seconds) in which those events/actions occur in the video. This information may be combined with the information from the matching module 2426 (and redundant events and times may be removed). This final set of timing and event information 2430 may be used to generate video snippets 2434 (FIG. 24B) that incorporate the actions/events of interest. The snippets may be a set amount of time (e.g., x seconds before the event through y seconds after the event, the snippet timespan may vary depending upon action type or detected event length from the video deep learning model(s) 2428, and/or, may have a length corresponding to the length of the audio from the text-to-speech module for the corresponding text about the event in the video clip.

In one or more embodiments, the input text 2408 or group of one or more sentences describing the event/action may be input into a text-to-speech (TTS) system 2432 that converts the input text into audio. In one or more embodiments, the text may be a compilation of audio segments generated by converting the sentences to audio with TTS.

One skilled in the art shall recognize that any of a number of TTS systems may be used. For example, several works address the issue of synthesizing speech with neural networks given an input text, including but not limited to:

Deep Voice 1 (which is disclosed in commonly-assigned U.S. patent application Ser. No. 15/882,926, filed on 29 Jan. 2018, entitled "SYSTEMS AND METHODS FOR REAL-TIME NEURAL TEXT-TO-SPEECH," and U.S. Prov. Pat. App. No. 62/463,482, filed on 24 Feb. 2017, entitled "SYSTEMS AND METHODS FOR REAL-TIME NEURAL TEXT-TO-SPEECH," each of the aforementioned patent documents is incorporated by reference herein in its entirety (which disclosures may be referred to, for convenience, as "Deep Voice 1" or "DV1");

Deep Voice 2 (which is disclosed in commonly-assigned U.S. patent application Ser. No. 15/974,397, filed on 8 May 2018, entitled "SYSTEMS AND METHODS FOR MULTI-SPEAKER NEURAL TEXT-TO-SPEECH," and U.S. Prov. Pat. App. No. 62/508,579, filed on 19 May 2017, entitled "SYSTEMS AND METHODS FOR MULTI-SPEAKER NEURAL TEXT-TO-SPEECH," each of the aforementioned patent documents is incorporated by reference herein in its entirety (which disclosures may be referred to, for convenience, as "Deep Voice 2" or "DV2");

Deep Voice 3 (which is disclosed in commonly-assigned U.S. patent application Ser. No. 16/058,265, filed on 8 Aug. 2018, entitled "SYSTEMS AND METHODS FOR NEURAL TEXT-TO-SPEECH USING CONVOLUTIONAL SEQUENCE LEARNING," and U.S. Provisional Patent Application No. 62/574,382, filed on 19 Oct. 2017, entitled "SYSTEMS AND METHODS FOR NEURAL TEXT-TO-SPEECH USING CONVOLUTIONAL SEQUENCE LEARNING," and listing Sercan Ö. Arik, Wei Ping, Kainan Peng, Sharan Narang, Ajay Kannan, Andrew Gibiansky, Jonathan Raiman, and John Miller as inventors (each of the aforementioned patent documents is incorporated by reference herein in its entirety (which disclosures may be referred to, for convenience, as "Deep Voice 3" or "DV3"));

embodiments disclosed in commonly-owned U.S. Pat. No. 10,872,596 issued on 22 Dec. 2020 (which patent document is incorporated by reference herein in its entirety); and embodiments disclosed in commonly-owned U.S. Pat. No. 11,017,761 issued on 25 May 2021 (which patent document is incorporated by reference herein in its entirety).

Figure 24B:
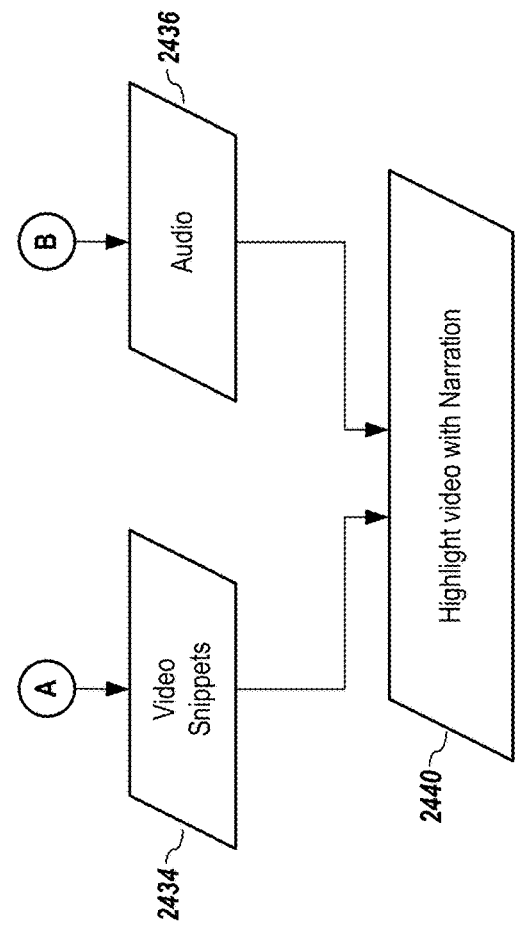
Figure 27:
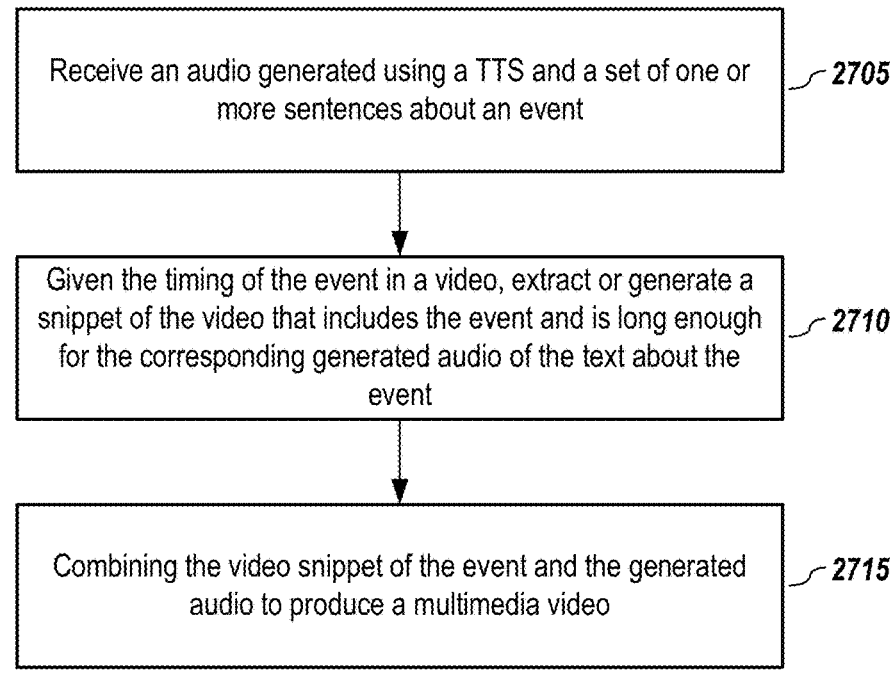
FIG. 27 depicts a method for combining a video snippet and corresponding audio snippet to create a summary video, according to embodiments of the present disclosure.

Turning to FIG. 24B, given the video snippets 2434 and corresponding audio 2436, the video and audio snippets may be combined into a game highlights video 2440. FIG. 27 depicts a method for generating a combined video, according to embodiments of the present disclosure.

As noted above, for each event, audio may be generated (2705) using a TTS and a set of one or more sentences about an event, in which the TTS converts the set of one or more sentences into audio have a specific length. Having ascertained an exact or approximate time of when the event occurs in the video, a video snippet that includes the event may be extracted (2710) from the full video, and its length may be selected so that it is long enough for the corresponding generated audio. For example, if TTS-generated audio for a sentence or group of sentences about one event (e.g., a corner kick) takes a certain amount of time, the corresponding video may be edited to match the length of the audio (e.g., the video may have a few seconds before the audio and a few seconds after the audio) about the event in the video snippet. Finally, the video snippet and the corresponding audio may be combined to have a multimedia video about the event. In one or more embodiments, a tool, such as the FFmpeg tool, may be used to combine the video snippets and the audio issues.

It shall be noted that the input text 2408 may reference a number of events/actions, and a number of video snippets with corresponding audios may be correlated and combined. For example, in one or more embodiments, the video clips are concatenated into a single final video and with the audio synced to the corresponding events. In one or more embodiments, a tool, such as the FFmpeg tool, may be used to combine the video snippets and the audio issues.

F. Computing System Embodiments

In one or more embodiments, aspects of the present patent document may be directed to, may include, or may be implemented on one or more information handling systems (or computing systems). An information handling system/ computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, stylus, touchscreen and/or video display. The computing system may also include one or more buses operable to transmit communications between the various hardware components.

Figure 28:
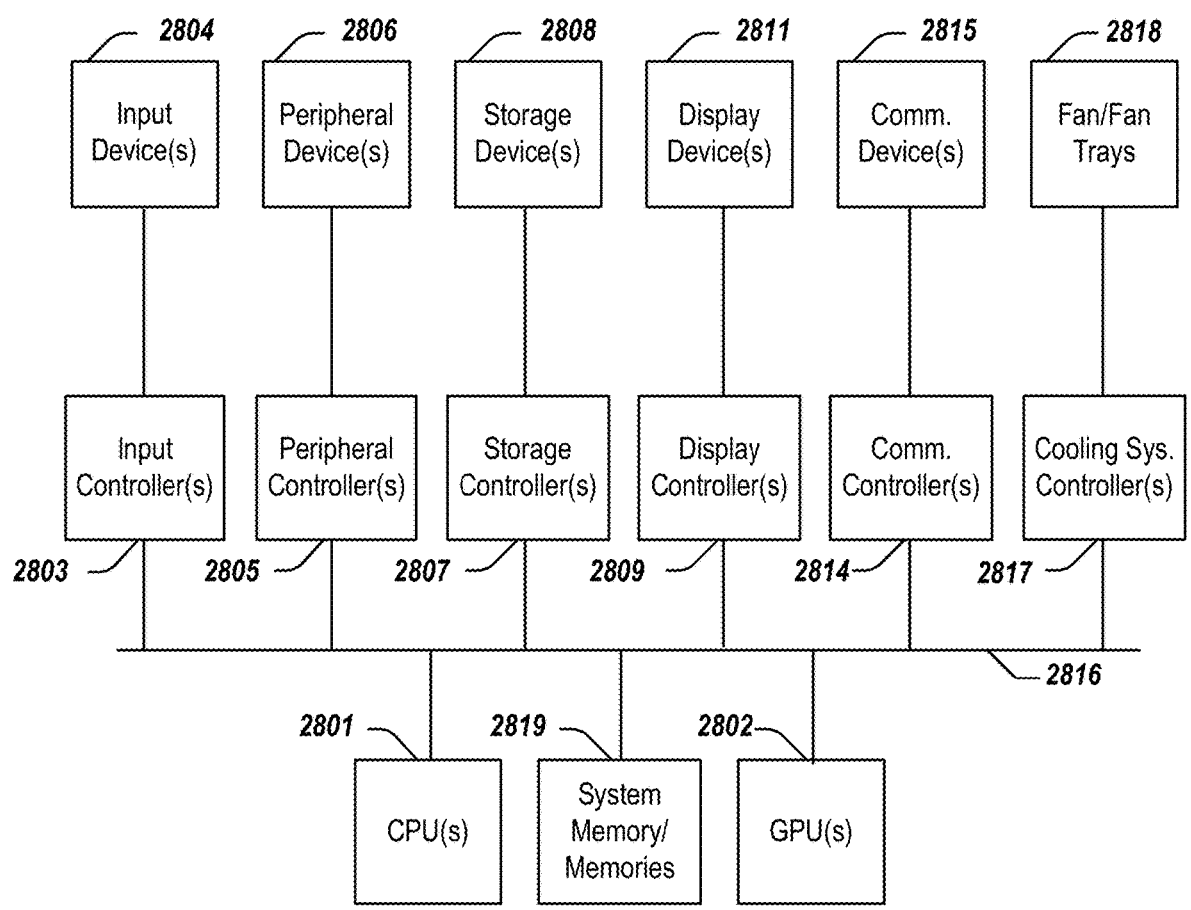
FIG. 28 depicts a simplified block diagram of a computing device/information handling system, according to embodiments of the present disclosure.

FIG. 28 depicts a simplified block diagram of an information handling system (or computing system), according to embodiments of the present disclosure. It will be understood that the functionalities shown for system 2800 may operate to support various embodiments of a computing system— although it shall be understood that a computing system may be differently configured and include different components, including having fewer or more components as depicted in FIG. 28.

As illustrated in FIG. 28, the computing system 2800 includes one or more central processing units (CPU) 2801 that provides computing resources and controls the computer. CPU 2801 may be implemented with a microprocessor or the like, and may also include one or more graphics processing units (GPU) 2802 and/or a floating-point coprocessor for mathematical computations. In one or more embodiments, one or more GPUs 2802 may be incorporated within the display controller 2809, such as part of a graphics card or cards. The system 2800 may also include a system memory 2819, which may comprise RAM, ROM, or both.

A number of controllers and peripheral devices may also be provided, as shown in FIG. 28. An input controller 2803 represents an interface to various input device(s) 2804, such as a keyboard, mouse, touchscreen, and/or stylus. The computing system 2800 may also include a storage controller 2807 for interfacing with one or more storage devices 2808 each of which includes a storage medium such as magnetic tape or disk, or an optical medium that might be used to record programs of instructions for operating systems, utilities, and applications, which may include embodiments of programs that implement various aspects of the present disclosure. Storage device(s) 2808 may also be used to store processed data or data to be processed in accordance with the disclosure. The system 2800 may also include a display controller 2809 for providing an interface to a display device 2811, which may be a cathode ray tube (CRT) display, a thin film transistor (TFT) display, organic light-emitting diode, electroluminescent panel, plasma panel, or any other type of display. The computing system 2800 may also include one or more peripheral controllers or interfaces 2805 for one or more peripherals 2806. Examples of peripherals may include one or more printers, scanners, input devices, output devices, sensors, and the like. A communications controller 2814 may interface with one or more communication devices 2815, which enables the system 2800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 2800 comprises one or more fans or fan trays 2818 and a cooling subsystem controller or controllers 2817 that monitors thermal temperature(s) of the system 2800 (or components thereof) and operates the fans/fan trays 2818 to help regulate the temperature.

In the illustrated system, all major system components may connect to a bus 2816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact disc (CD) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as a CD and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
given an input text comprising a reference to an event in an activity,
parsing the input text, using a text parsing module, to identify the event referenced in the input text; and
using a text-to-speech (TTS) module to convert the input text into TTS-generated audio;
given an input video that comprises the event:
obtaining a time mapping by performing time anchoring to correlate runtime of the input video with runtime of the activity;
generating an initial video clip from the input video that includes the event by using timing information related to the activity and the time mapping obtained by time anchoring to identify an approximate time in the input video of when the event occurred;
extracting features from the initial video clip;
obtaining a final time value of the event in the initial video clip using the extracted features and one or more trained neural network models;
responsive to a runtime of the initial video clip being inconsistent with a runtime of the TTS-generated audio, generating a final video clip by editing the initial video clip to have a runtime consistent with the runtime of the TTS-generated audio; and
responsive to the runtime of the initial video clip being consistent with the runtime of the TTS-generated audio, using the initial video clip as the final video clip; and
combining the TTS-generated audio with the final video clip to generate an event highlight video.

2. The computer-implemented method of claim 1 wherein the step of obtaining a time mapping by performing time anchoring to correlate runtime of the input video with runtime of the activity comprises:
using optical character recognition on a set of video frames of the input video to read time of a clock displayed in the input video;
given the recognized time of the clock, generating a set of time anchors, which comprises a time of the activity and a set of temporal shifts, if any; and
generating the time mapping that maps time of the clock with the input video runtime using at least some of the time anchors in the set of time anchors.

3. The computer-implemented method of claim 2 wherein the step of generating an initial video clip from the input video that includes the event by using timing information related to the activity and the time mapping obtained by time anchoring to identify an approximate time in the input video of when the event occurred comprises:
parsing data from metadata to obtain an approximate time for the event; and
using the approximate time for the event and the time mapping to generate the initial video clip, which includes the event.

4. The computer-implemented method of claim 1 wherein the steps of extracting features from the initial video clip and obtaining a final time value of the event in the initial video clip using the extracted features and one or more trained neural network models comprise:
performing feature extraction on the initial video clip using a set of two or more models; and
obtaining the final time value of the event in the initial video clip using an ensemble neural network model that receives input related to the features from the set of two or more models and outputs the final time value.

5. The computer-implemented method of claim 4 wherein the set of two or more models comprises:
a neural network model that extracts video features from the initial video clip;
a multimodal features neural network model that utilized video and audio information in the initial video clip to generate multimodal-based features; and
an audio feature extractor that generates a feature for the initial video clip based upon audio levels in the initial video clip.

6. The computer-implemented method of claim 1 further comprising:
generating a dataset comprising one or more entities related to the activity; and
using the dataset to filter text parsed from the input text to help identify which text parsed from the input text comprises information about the event.

7. The computer-implemented method of claim 1 further comprising:
given a supplemental text about the activity or event,
parsing the supplemental text, using a text parsing module, to identify information related to the event referenced in the supplemental text; and
using the information extracted from the supplemental text to help identify a time of occurrence of the event.

8. The computer-implemented method of claim 1 wherein the text parsing module is neural network-based, rules-based, or both.

9. A system comprising:
one or more processors; and
a non-transitory computer-readable medium or media comprising one or more sets of instructions which, when executed by at least one of the one or more processors, causes steps to be performed comprising:
given an input text comprising a reference to an event in an activity,
parsing the input text, using a text parsing module, to identify the event referenced in the input text; and
using a text-to-speech (TTS) module to convert the input text into TTS-generated audio;
given an input video that comprises the event:
obtaining a time mapping by performing time anchoring to correlate runtime of the input video with runtime of the activity;
generating an initial video clip from the input video that includes the event by using timing information related to the activity and the time mapping obtained by time anchoring to identify an approximate time in the input video of when the event occurred;
extracting features from the initial video clip;
obtaining a final time value of the event in the initial video clip using the extracted features and one or more trained neural network models;
responsive to a runtime of the initial video clip being inconsistent with a runtime of the TTS-generated audio, generating a final video clip by editing the initial video clip to have a runtime consistent with the runtime of the TTS-generated audio; and
responsive to the runtime of the initial video clip being consistent with the runtime of the TTS-generated audio, using the initial video clip as the final video clip; and
combining the TTS-generated audio with the final video clip to generate an event highlight video.

10. The system of claim 9 wherein the step of obtaining a time mapping by performing time anchoring to correlate runtime of the input video with runtime of the activity comprises:
using optical character recognition on a set of video frames of the input video to read time of a clock displayed in the input video;
given the recognized time of the clock, generating a set of time anchors, which comprises a time of the activity and a set of temporal shifts, if any; and
generating the time mapping that maps time of the clock with the input video runtime using at least some of the time anchors in the set of time anchors.

11. The system of claim 10 wherein the step of generating an initial video clip from the input video that includes the event by using timing information related to the activity and the time mapping obtained by time anchoring to identify an approximate time in the input video of when the event occurred comprises:
parsing data from metadata to obtain an approximate time for the event; and
using the approximate time for the event and the time mapping to generate the initial video clip, which includes the event.

12. The system of claim 9 wherein the steps of extracting features from the initial video clip and obtaining a final time value of the event in the initial video clip using the extracted features and one or more trained neural network models comprise:
performing feature extraction on the initial video clip using a set of two or more models; and
obtaining the final time value of the event in the initial video clip using an ensemble neural network model that receives input related to the features from the set of two or more models and outputs the final time value.

13. The system of claim 12 wherein the set of two or more models comprises:
a neural network model that extracts video features from the initial video clip;
a multimodal features neural network model that utilized video and audio information in the initial video clip to generate multimodal-based features; and
an audio feature extractor that generates a feature for the initial video clip based upon audio levels in the initial video clip.

14. The system of claim 9 wherein the non-transitory computer-readable medium or media further comprises one or more sets of instructions which, when executed by at least one of the one or more processors, causes steps to be performed comprising:
generating a dataset comprising one or more entities related to the activity; and
using the dataset to filter text parsed from the input text to help identify which text parsed from the input text comprises information about the event.

15. The system of claim 9 wherein the non-transitory computer-readable medium or media further comprises one or more sets of instructions which, when executed by at least one of the one or more processors, causes steps to be performed comprising:
given a supplemental text about the activity or event,
parsing the supplemental text, using a text parsing module, to identify information related to the event referenced in the supplemental text; and
using the information extracted from the supplemental text to help identify a time of occurrence of the event.

16. A non-transitory computer-readable medium or media comprising one or more sequences of instructions which, when executed by at least one processor, causes steps to be performed comprising:
given an input text comprising a reference to an event in an activity,
parsing the input text, using a text parsing module, to identify the event referenced in the input text; and
using a text-to-speech (TTS) module to convert the input text into TTS-generated audio;
given an input video that comprises the event:
obtaining a time mapping by performing time anchoring to correlate runtime of the input video with runtime of the activity;
generating an initial video clip from the input video that includes the event by using timing information related to the activity and the time mapping obtained by time anchoring to identify an approximate time in the input video of when the event occurred;
extracting features from the initial video clip;
obtaining a final time value of the event in the initial video clip using the extracted features and one or more trained neural network models;
responsive to a runtime of the initial video clip being inconsistent with a runtime of the TTS-generated audio, generating a final video clip by editing the initial video clip to have a runtime consistent with the runtime of the TTS-generated audio; and
responsive to the runtime of the initial video clip being consistent with the runtime of the TTS-generated audio, using the initial video clip as the final video clip; and combining the TTS-generated audio with the final video clip to generate an event highlight video.

17. The non-transitory computer-readable medium or media of claim 16 wherein the step of obtaining a time mapping by performing time anchoring to correlate runtime of the input video with runtime of the activity comprises:

using optical character recognition on a set of video frames of the input video to read time of a clock displayed in the input video;

given the recognized time of the clock, generating a set of time anchors, which comprises a time of the activity and a set of temporal shifts, if any; and generating the time mapping that maps time of the clock with the input video runtime using at least some of the time anchors in the set of time anchors.

18. The non-transitory computer-readable medium or media of claim 17 wherein the step of generating an initial video clip from the input video that includes the event by using timing information related to the activity and the time mapping obtained by time anchoring to identify an approximate time in the input video of when the event occurred during the activity comprises:

parsing data from metadata to obtain an approximate time for the event; and using the approximate time for the event and the time mapping to generate the initial video clip, which includes the event.

19. The non-transitory computer-readable medium or media of claim 16 wherein the steps of extracting features from the initial video clip and obtaining a final time value of the event in the initial video clip using the extracted features and one or more trained neural network models comprise:

performing feature extraction on the initial video clip using a set of two or more models; and obtaining the final time value of the event in the initial video clip using an ensemble neural network model that receives input related to the features from the set of two or more models and outputs the final time value.

20. The non-transitory computer-readable medium or media of claim 16 further comprising one or more sequences of instructions which, when executed by at least one processor, causes steps to be performed comprising:

given a supplemental text about the activity or event, parsing the supplemental text, using a text parsing module, to identify information related to the event referenced in the supplemental text; and using the information extracted from the supplemental text to help identify a time of occurrence of the event.

* * * * *